(12) United States Patent
Peng et al.

(10) Patent No.: US 11,477,495 B2
(45) Date of Patent: Oct. 18, 2022

(54) LIVE BROADCAST METHOD AND SYSTEM, AND RELATED DEVICE

(71) Applicant: Huawei Technologies Co., Ltd., Shenzhen (CN)

(72) Inventors: Qiaoqiao Peng, Nanjing (CN); Chuansong Xue, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 104 days.

(21) Appl. No.: 16/700,379

(22) Filed: Dec. 2, 2019

(65) Prior Publication Data

US 2020/0107050 A1    Apr. 2, 2020

Related U.S. Application Data

(63) Continuation of application No. PCT/CN2018/082775, filed on Apr. 12, 2018.

(30) Foreign Application Priority Data

May 31, 2017   (CN) .......................... 201710399816.X

(51) Int. Cl.
| | |
|---|---|
| *H04N 21/2187* | (2011.01) |
| *H04N 21/222* | (2011.01) |
| *H04N 21/2387* | (2011.01) |
| *H04N 21/437* | (2011.01) |
| *H04N 21/643* | (2011.01) |
| *H04L 61/5007* | (2022.01) |
| *H04L 67/55* | (2022.01) |

(52) U.S. Cl.
CPC ..... *H04N 21/2187* (2013.01); *H04L 61/5007* (2022.05); *H04L 67/55* (2022.05); *H04N 21/222* (2013.01); *H04N 21/2387* (2013.01); *H04N 21/437* (2013.01); *H04N 21/64322* (2013.01)

(58) Field of Classification Search
CPC ............. H04N 21/2187; H04N 21/222; H04N 21/2387; H04N 21/437; H04N 21/64322; H04L 61/2007; H04L 67/26
See application file for complete search history.

(56) References Cited

U.S. PATENT DOCUMENTS

| | | | |
|---|---|---|---|
| 6,195,366 B1 * | 2/2001 | Kayashima | ....... H04L 29/12216 370/401 |
| 8,990,418 B1 * | 3/2015 | Bragg | ..................... H04L 65/60 709/219 |
| 2008/0066130 A1 | 3/2008 | Elbarky | |
| 2011/0296460 A1 * | 12/2011 | Jin | ..................... H04N 21/2393 725/37 |

(Continued)

FOREIGN PATENT DOCUMENTS

| | | |
|---|---|---|
| CN | 101309393 A | 11/2008 |
| CN | 102427463 B | 4/2015 |

*Primary Examiner* — Michael R Telan
(74) *Attorney, Agent, or Firm* — Conley Rose, P.C.

(57) ABSTRACT

A live broadcast method includes: receiving, by a live broadcast client, a push-stream address sent by the live broadcast management server; sending, by the live broadcast client, a proxy push-stream request to a live broadcast proxy client; and sending, by the live broadcast client, collected live broadcast data to the live broadcast proxy client, and pushing the live broadcast data to a live broadcast server over an uplink of a dedicated network connected to the live broadcast proxy client.

18 Claims, 24 Drawing Sheets

(56) References Cited

U.S. PATENT DOCUMENTS

| | | | |
|---|---|---|---|
| 2011/0299835 A1* | 12/2011 | Fleming | H04N 21/25875 386/280 |
| 2012/0047539 A1* | 2/2012 | Hao | H04N 21/2747 725/82 |
| 2012/0110516 A1 | 5/2012 | Tumanov | |
| 2012/0284736 A1* | 11/2012 | Friedman | H04N 21/2665 725/116 |
| 2013/0144954 A1* | 6/2013 | Li | H04L 67/26 709/205 |
| 2014/0282786 A1* | 9/2014 | Lajoie | H04N 21/44 725/115 |
| 2016/0028846 A1 | 1/2016 | Coglitore et al. | |
| 2016/0323238 A1* | 11/2016 | Yuan | H04L 61/2007 |
| 2017/0048293 A1 | 2/2017 | Huang et al. | |
| 2018/0020246 A1* | 1/2018 | Harrison | H04L 65/4069 |

\* cited by examiner

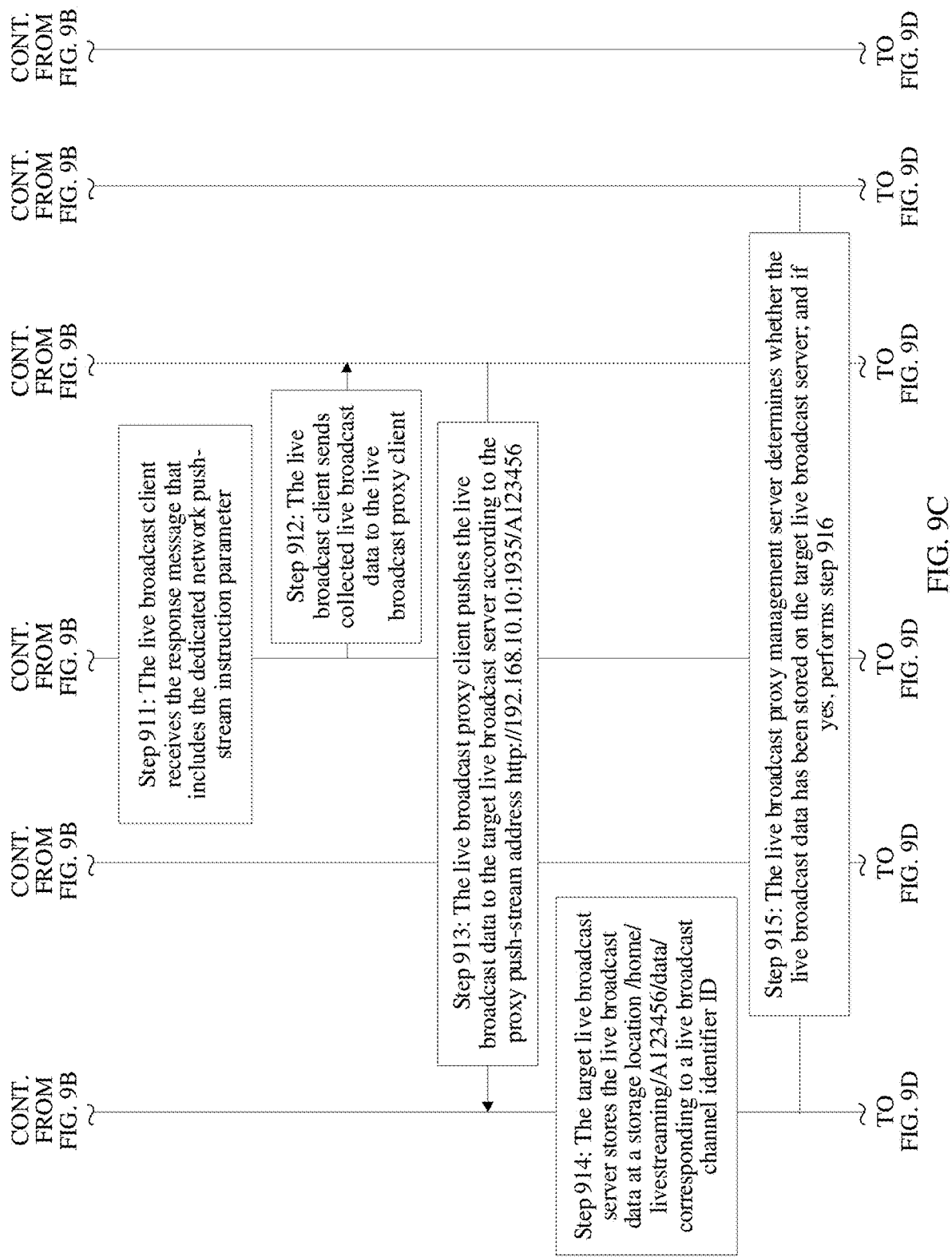

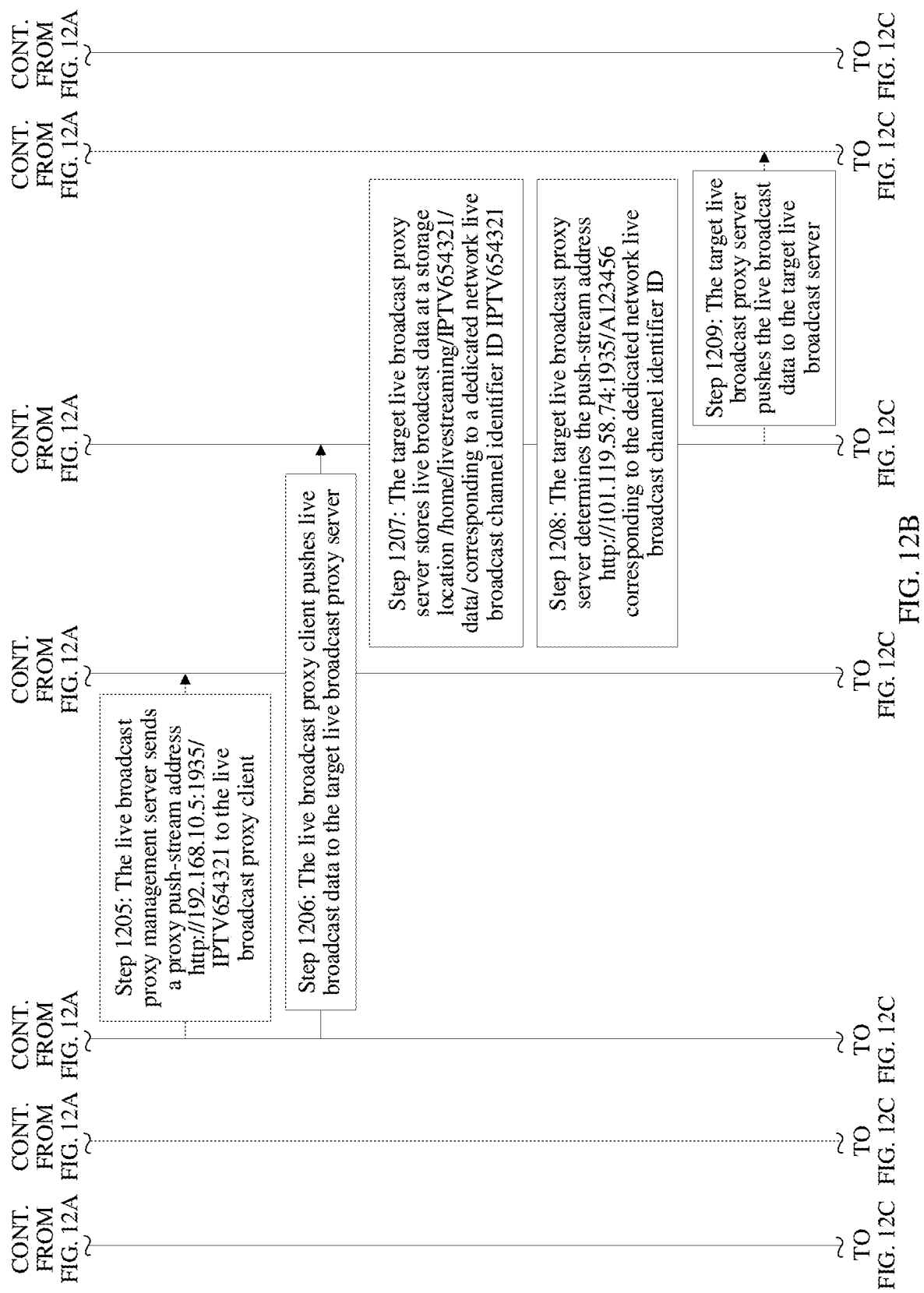

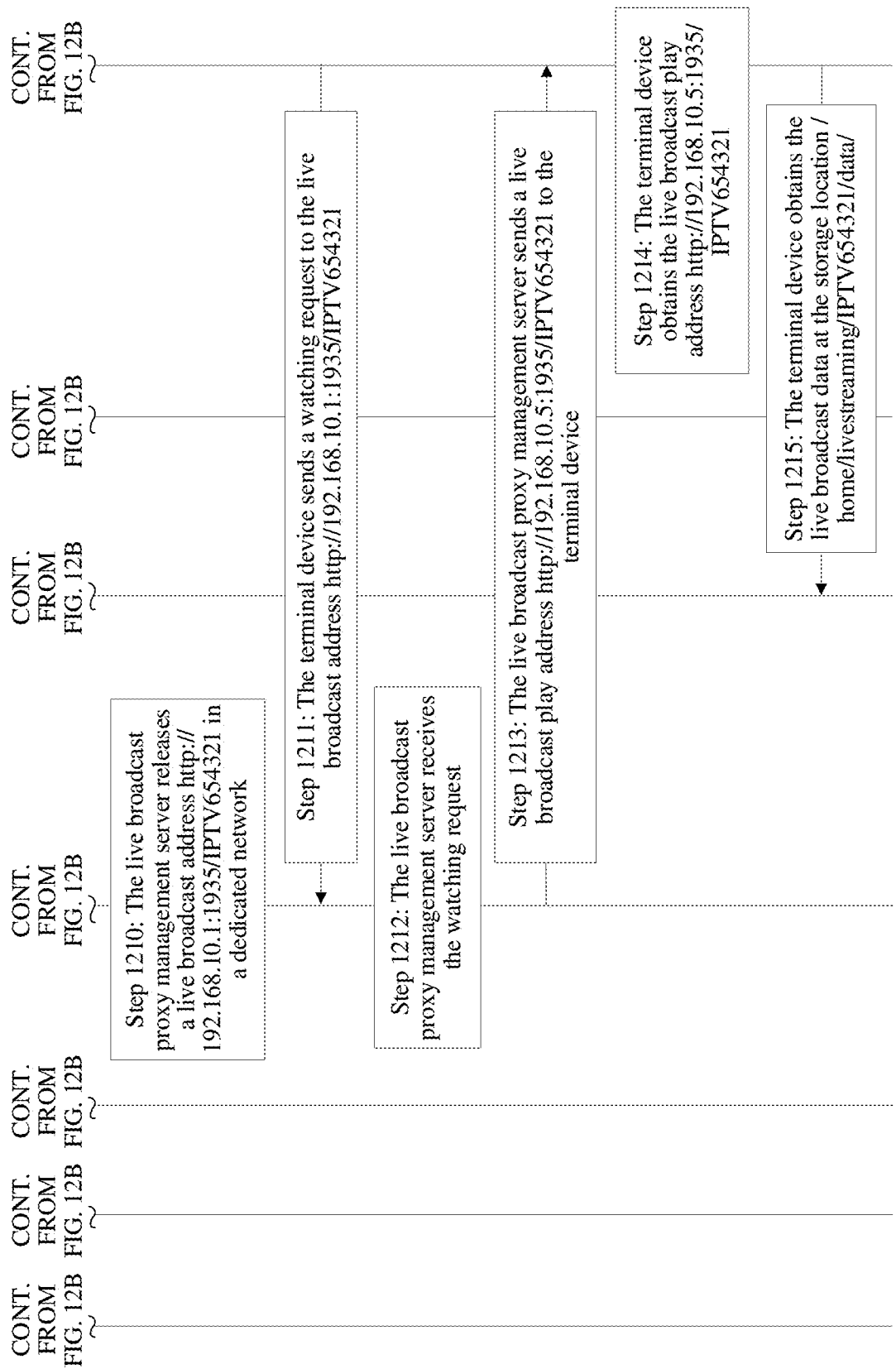

LIVE BROADCAST METHOD AND SYSTEM, AND RELATED DEVICE

CROSS-REFERENCE TO RELATED APPLICATIONS

This is a continuation of Int'l Patent App. No. PCT/CN2018/082775 filed on Apr. 12, 2018, which claims priority to Chinese Patent App. No. 201710399816.X filed on May 31, 2017, which are incorporated by reference.

TECHNICAL FIELD

The present disclosure relates to the field of communications technologies, and in particular, to a live broadcast method and system, and a related device.

BACKGROUND

With the development of multimedia technologies, currently it has become a trend to enjoy rich and colorful multimedia services on various terminals. A user can share a video shot by the user, with another person in a live broadcast manner by using the Internet. For implementation of a live broadcast, refer to FIG. 1. FIG. 1 is a schematic structural diagram of a live broadcast network. The live broadcast network includes a live broadcast client 101, a live broadcast management server 102, a live broadcast server 103, and a playback end 104. The live broadcast client 101 is configured to assist in collecting and pushing live broadcast content, and the live broadcast management server 102 is configured to schedule the live broadcast server 103, create a live broadcast channel, and the like.

Based on the live broadcast network shown in FIG. 1, a live broadcast releasing process is as follows:

Step 201: The live broadcast client initiates a push-stream request to the live broadcast management server by using the Internet.

Step 202: The live broadcast management server schedules one live broadcast server, and creates a live broadcast channel on the live broadcast server.

Step 203: The live broadcast management server records a correspondence between a created live broadcast channel identifier (ID) and the Internet Protocol (IP) address of the scheduled live broadcast server.

Step 204: The live broadcast management server responds with a uniform resource locator address of a push stream to the live broadcast client.

The uniform resource locator address of the push stream includes the created live broadcast channel ID and the IP address of the scheduled live broadcast server.

Step 205: After receiving the uniform resource locator address of the push stream, the live broadcast client pushes live broadcast data to the scheduled live broadcast server.

Step 206: The scheduled live broadcast server receives the live broadcast data, and stores the live broadcast data at a storage location associated with the live broadcast channel ID.

The playback end 104 shown in FIG. 1 can obtain the live broadcast data located on the scheduled live broadcast server, so that a user can play the live broadcast data by using the playback end 104.

A disadvantage in the above approach is that the live broadcast client can upload the live broadcast data only over the Internet uplink. However, the Internet service used in an existing user's home usually does not have a quality of service (QoS) guarantee on an uplink. In addition, usually an uplink bandwidth in a user's home is relatively narrow (no more than 4 megabits per second (Mbps). Therefore, an existing live broadcast service may easily get offline, and has poor image quality and a high latency. In particular, the existing live broadcast service cannot support a 4K/8K live broadcast push-stream smoothly, limiting promotion of an ultra-high-definition live broadcast service.

SUMMARY

The present disclosure provides a live broadcast method and system, and a related device, to push live broadcast data over an uplink with a QoS guarantee. Therefore, a live broadcast service is stable and has relatively high image quality and a low latency, so as to facilitate promotion of an ultra-high-definition live broadcast service.

To achieve the foregoing objective, the following technical solutions are used in embodiments of the present disclosure.

According to a first aspect, an embodiment of the present disclosure provides a live broadcast method, where the method is applied to a live broadcast client, the live broadcast client is communicatively connected to a live broadcast proxy client by using a home network and is communicatively connected to a live broadcast management server and a live broadcast server by using an Internet, and the live broadcast proxy client is further communicatively connected to a device in a dedicated network.

Specifically, the dedicated network may be any network whose uplink has a QoS guarantee, such as the Internet protocol television network. The live broadcast proxy client may be a set top box. Specifically, the home network may be any local area network, such as a mobile network, a wireless local area network, or a Bluetooth network.

In a possible implementation, both the live broadcast client and the live broadcast proxy client are connected to a network covered by a router, and a wide area network (WAN) port of the router is connected to the Internet.

Specifically, the method includes: sending, by the live broadcast client, a push-stream request to the live broadcast management server; receiving, by the live broadcast client, a push-stream address sent by the live broadcast management server, where the live broadcast management server schedules one live broadcast server for the live broadcast client based on the push-stream request; for example, the live broadcast management server may schedule a live broadcast server closest to the live broadcast client for the live broadcast client; for another example, the live broadcast management server determines to schedule a live broadcast server whose load is less than a preset value for the live broadcast client; and the push-stream address includes an IP address of the live broadcast server scheduled by the live broadcast management server for the live broadcast client; sending, by the live broadcast client, a proxy push-stream request to the live broadcast proxy client, where the proxy push-stream request includes the push-stream address, and the proxy push-stream request is used to determine a live broadcast server for receiving live broadcast data; and sending, by the live broadcast client, collected live broadcast data to the live broadcast proxy client, and pushing the live broadcast data to the live broadcast server over an uplink of the dedicated network connected to the live broadcast proxy client.

In this embodiment of the present disclosure, the live broadcast client pushes the live broadcast data to the live broadcast server over the uplink of the dedicated network connected to the live broadcast proxy client, thereby effectively resolving current problems of a high latency and a high packet loss rate existing when an uplink of the Internet is used to push the live broadcast data.

In a possible implementation, before the sending, by the live broadcast client, collected live broadcast data to the live broadcast proxy client, the method further includes: receiving, by the live broadcast client, a response message that is sent by the live broadcast proxy client and that includes a dedicated network push-stream instruction parameter, where the dedicated network push-stream instruction parameter is used to instruct the live broadcast client to push the live broadcast data to the live broadcast server over the uplink of the dedicated network connected to the live broadcast proxy client. Specifically, the dedicated network push-stream instruction parameter may be one flag bit. When the flag bit is set to "1", it indicates that the live broadcast client can push the live broadcast data to the live broadcast server over the uplink of the dedicated network connected to the live broadcast proxy client. In this case, the live broadcast client pushes a stream according to the solution provided in this embodiment of the present disclosure. When the flag bit is set to "0", it indicates that the live broadcast client cannot push the live broadcast data to the live broadcast server over the uplink of the dedicated network connected to the live broadcast proxy client (for example, a host that uses the live broadcast client has no permission to push a stream by using the dedicated network, or currently resources in the dedicated network are insufficient for the live broadcast client to push the stream). In this case, the live broadcast client performs the push stream over the uplink of the Internet as in other approaches.

According to the method provided in this embodiment of the present disclosure, the live broadcast client has another possible push stream path in addition to pushing the stream by using the existing Internet. When the live broadcast client is able to push the stream over the uplink of the dedicated network, the stream may be pushed over the uplink of the dedicated network. When the live broadcast client cannot push the stream over the uplink of the dedicated network due to a reason such as a lack of permission or insufficient resources in the dedicated network, the stream may be pushed over the uplink of the Internet as in other approaches. Compatibility with an existing solution is also considered in a case of ensuring a live broadcast stream pushing effect.

In a possible implementation, the device in the dedicated network includes a live broadcast proxy management server. Before the sending, by the live broadcast client, collected live broadcast data to the live broadcast proxy client, and pushing the live broadcast data to the live broadcast server over an uplink of the dedicated network connected to the live broadcast proxy client, the method further includes: sending, by the live broadcast proxy client to the live broadcast proxy management server, the proxy push-stream request sent by the live broadcast client; and determining, by the live broadcast proxy management server based on an IP address in the proxy push-stream request, that the live broadcast server has a corresponding dedicated network address in the dedicated network, and returning a proxy push-stream address to the live broadcast proxy client, where the proxy push-stream address includes a dedicated network address of the live broadcast server; and subsequently, when receiving live broadcast data sent by the live broadcast client, the live broadcast proxy client may send the live broadcast data to the live broadcast server based on the dedicated network address of the live broadcast server.

One address mapping table is maintained on the live broadcast proxy management server and is used for recording a correspondence between an IP address and a dedicated network address that are of the live broadcast server. After receiving the proxy push-stream request, the live broadcast proxy management server parses out the IP address of the live broadcast server from the proxy push-stream request. The live broadcast proxy management server may query the address mapping table to determine whether the address mapping table stores a dedicated network address corresponding to the IP address of the live broadcast server. If the address mapping table stores a dedicated network address corresponding to the IP address of the live broadcast server, it indicates that the live broadcast server scheduled by the live broadcast management server has a corresponding dedicated network address in the dedicated network.

The live broadcast proxy management server sends the dedicated network address of the live broadcast server to the live broadcast proxy client, so that subsequently, after receiving the live broadcast data destined for the live broadcast server, the live broadcast proxy client forwards the live broadcast data to the live broadcast server based on the dedicated network address.

In another possible implementation, the devices in the dedicated network include a live broadcast proxy management server and a live broadcast proxy server, and the push-stream address further includes a live broadcast channel ID. Before the sending, by the live broadcast client, collected live broadcast data to the live broadcast proxy client, and pushing the live broadcast data to the live broadcast server over an uplink of the dedicated network connected to the live broadcast proxy client, the method further includes: sending, by the live broadcast proxy client to the live broadcast proxy management server, the proxy push-stream request sent by the live broadcast client; and determining, by the live broadcast proxy management server, that the live broadcast proxy server exists in the dedicated network, where the live broadcast proxy server has both an IP address and a dedicated network address. In actual deployment, a cluster including a plurality of live broadcast proxy servers may exist in the dedicated network. The live broadcast proxy management server is configured to maintain the cluster including the live broadcast proxy servers. When receiving the proxy push-stream request sent by the live broadcast proxy client, the live broadcast proxy management server schedules one live broadcast proxy server for the live broadcast proxy client. Then, the live broadcast proxy management server creates, on the scheduled live broadcast proxy server, a dedicated network live broadcast channel ID corresponding to the live broadcast channel ID, and saves, on the live broadcast proxy server, a correspondence between the dedicated network live broadcast channel ID and the push-stream address. The live broadcast proxy management server sends a proxy push-stream address to the live broadcast proxy client. The proxy push-stream address includes the dedicated network address of the live broadcast proxy server and the dedicated network live broadcast channel ID. The sending, by the live broadcast client, collected live broadcast data to the live broadcast proxy client, and pushing the live broadcast data to the live broadcast server over an uplink of the dedicated network connected to the live broadcast proxy client is specifically: receiving, by the live broadcast proxy client, the live broadcast data sent by the live broadcast client, and pushing the received live broadcast data to the live broadcast proxy server based on the proxy push-stream address; and after receiving the live broadcast data, forwarding and pushing, by the live broadcast proxy server, the live broadcast data to the live broadcast server based on the push-stream address.

In this implementation, only one live broadcast proxy management server and one live broadcast proxy server need to be deployed in the dedicated network. The live broadcast proxy server needs to access both the dedicated network and the Internet, to avoid impact on an existing live broadcast system. That is, a dedicated network address does not need to be configured for an existing deployed live broadcast server.

In a possible implementation, when the device in the dedicated network includes a live broadcast proxy management server (there is no live broadcast proxy server in the dedicated network, and the live broadcast server accesses both the dedicated network and the Internet), after the sending, by the live broadcast client, collected live broadcast data to the live broadcast proxy client, and pushing the live broadcast data to the live broadcast server over an uplink of the dedicated network connected to the live broadcast proxy client, the following steps that can implement watching of the live broadcast data are further included:

Step E11: The live broadcast proxy management server releases a live broadcast address in the dedicated network.

The live broadcast proxy management server may query, by using a dedicated network link, whether the live broadcast data has been stored on the live broadcast server. If the live broadcast proxy management server determines that the live broadcast data has been stored on the live broadcast server, the live broadcast proxy management server may release the live broadcast address.

The live broadcast address includes an address of the live broadcast proxy management server and the live broadcast channel ID.

Step E12: A terminal device sends a watching request to the live broadcast proxy management server.

The terminal device in this implementation can be communicatively connected to the live broadcast proxy management server and the live broadcast server by using the dedicated network. The terminal device may send, to the live broadcast proxy management server over the uplink of the dedicated network, the watching request used for requesting the live broadcast data.

Step E13: The live broadcast proxy management server receives the watching request.

Step E14: The live broadcast proxy management server sends a live broadcast play address to the terminal device.

The live broadcast proxy management server has saved the correspondence between the live broadcast channel ID and the dedicated network address of the live broadcast server. When the live broadcast proxy management server obtains the live broadcast channel ID included in the watching request, the live broadcast proxy management server may determine the dedicated network address of the live broadcast server that is corresponding to the live broadcast channel ID.

The live broadcast proxy management server generates the live broadcast play address. The live broadcast play address includes the live broadcast channel ID and the dedicated network address of the live broadcast server.

Step E15: The terminal device obtains the live broadcast data.

Specifically, the terminal device can be interconnected to the live broadcast server based on the live broadcast play address, so that the terminal device can obtain, based on the live broadcast play address, the live broadcast data stored at a storage location corresponding to the live broadcast channel ID. In this way, the live broadcast data can be played on the terminal device.

It can be learned that in this implementation, the live broadcast client can obtain the live broadcast data over the uplink, of the dedicated network, with a QoS guarantee and a high bandwidth, thereby effectively avoiding a case in which the live broadcast client gets offline. Therefore, a probability of successful live broadcast data transmission is increased, and the live broadcast data has high image quality and a low latency. In addition, efficiency of obtaining the live broadcast data is improved, so that the live broadcast client plays a video of high-definition or even 4K/8K video quality.

In a possible implementation, when the device in the dedicated network includes a live broadcast proxy management server (there is no live broadcast proxy server in the dedicated network, and the live broadcast server accesses both the dedicated network and the Internet), after the sending, by the live broadcast client, collected live broadcast data to the live broadcast proxy client, and pushing the live broadcast data to the live broadcast server over an uplink of the dedicated network connected to the live broadcast proxy client, the following steps that can implement watching of the live broadcast data are further included:

Step E21: The live broadcast proxy management server releases a live broadcast address in the dedicated network.

Specifically, the live broadcast proxy management server may query, by using a dedicated network link, whether the live broadcast data has been stored on the target live broadcast proxy server. If the live broadcast proxy management server determines that the live broadcast data has been stored on the target live broadcast proxy server, the live broadcast proxy management server may release the live broadcast address.

The live broadcast address includes an address of the live broadcast proxy management server and the dedicated network live broadcast channel ID.

Specifically, the address of the live broadcast proxy management server is an address of the live broadcast proxy management server in the dedicated network.

The dedicated network live broadcast channel ID is an ID of a dedicated network live broadcast channel created by the live broadcast proxy management server on the target live broadcast proxy server.

Step E22: A terminal device sends a watching request to the live broadcast proxy management server.

The terminal device in this embodiment may send the watching request to the live broadcast proxy management server over the uplink of the dedicated network. Specifically, the watching request includes the dedicated network live broadcast channel ID.

Step E23: The live broadcast proxy management server receives the watching request.

It can be learned from the foregoing steps that the live broadcast proxy management server has recorded a correspondence between the dedicated network live broadcast channel ID and a dedicated network address of the live broadcast proxy server. In this step, the live broadcast proxy management server may determine, based on the dedicated network live broadcast channel ID included in the watching request, the dedicated network address of the live broadcast proxy server that is corresponding to the dedicated network live broadcast channel ID. It can be learned from the foregoing description that the live broadcast data in this embodiment is stored at the storage location corresponding to the dedicated network live broadcast channel ID.

Step E24: The live broadcast proxy management server sends a live broadcast play address to the terminal device.

Specifically, the live broadcast proxy management server may send the live broadcast play address to the terminal device by using the dedicated network. Specifically, the live broadcast play address includes the dedicated network live broadcast channel ID and the dedicated network address of the live broadcast proxy server.

Step E25: The terminal device obtains the live broadcast data.

Specifically, the terminal device in this embodiment can be interconnected to the live broadcast proxy server based on the live broadcast play address, so that the terminal device can obtain the live broadcast data that is stored on the live broadcast proxy server and that is at the storage location corresponding to the dedicated network live broadcast channel ID.

In the foregoing provided possible implementations, regardless of whether the live broadcast server accesses both the Internet and the dedicated network or the live broadcast server accesses only the Internet while the live broadcast proxy server accesses both the Internet and the dedicated network, same live broadcast data is pushed to both the Internet and the dedicated network. A terminal user may obtain, as in other approaches, the live broadcast data by using the Internet, and may also obtain the live broadcast data by using the dedicated network. Therefore, a user scope of a live broadcast service is expanded. Because the live broadcast data can be pushed to both the Internet and the dedicated network, a terminal device that needs to play the live broadcast data has more access manners. Because the live broadcast data can be played on the dedicated network in the live broadcast method in this embodiment, a user accustomed to using the dedicated network can also watch the live broadcast data, thereby greatly expanding a user scope of the live broadcast service.

According to a second aspect, an embodiment of the present disclosure provides a live broadcast method, where the method is applied to a live broadcast proxy client, the live broadcast proxy client is communicatively connected to a live broadcast client by using a home network and is communicatively connected to a device in a dedicated network by using the dedicated network, the device in the dedicated network includes a live broadcast proxy management server, and the method includes: receiving, by the live broadcast proxy client, a proxy push-stream request sent by the live broadcast client, where the proxy push-stream request includes an IP address of the live broadcast server; sending, by the live broadcast proxy client, the proxy push-stream request to the live broadcast proxy management server; receiving, by the live broadcast proxy client, a proxy push-stream address returned by the live broadcast proxy management server; and receiving, by the live broadcast proxy client, live broadcast data sent by the live broadcast client, and pushing the live broadcast data to the live broadcast server over an uplink of the dedicated network based on the proxy push-stream address.

For detailed descriptions of the proxy push-stream address, refer to the first aspect of the present disclosure. Details are not described again.

For a detailed process in which the live broadcast proxy client pushes the live broadcast data over the uplink of the dedicated network, refer to the first aspect of the present disclosure. Details are not described again.

For detailed descriptions of beneficial effects of the live broadcast method in this aspect, refer to the first aspect of the present disclosure. Details are not described again.

In a possible implementation, after the receiving, by the live broadcast proxy client, a proxy push-stream address returned by the live broadcast proxy management server, the method further includes: sending, by the live broadcast proxy client to the live broadcast client, a response message that includes a dedicated network push-stream instruction parameter, where the dedicated network push-stream instruction parameter is used to instruct the live broadcast client to push the live broadcast data to the live broadcast server over the uplink of the dedicated network connected to the live broadcast proxy client.

For detailed descriptions of the response message that includes the dedicated network push-stream instruction parameter, refer to the first aspect of the present disclosure. Details are not described again.

In a possible implementation, the proxy push-stream address includes a dedicated network address of the live broadcast server. For detailed descriptions of the proxy push-stream address, refer to the first aspect of the present disclosure. Details are not described again.

In a possible implementation, the device in the dedicated network further includes a live broadcast proxy server, and the proxy push-stream request further includes a live broadcast channel ID; and before the receiving, by the live broadcast proxy client, a proxy push-stream address returned by the live broadcast proxy management server, the method further includes: determining, by the live broadcast proxy management server, that the live broadcast proxy server exists in the dedicated network, where the live broadcast proxy server has both an IP address and a dedicated network address; and creating, by the live broadcast proxy management server on the live broadcast proxy server, a dedicated network live broadcast channel ID corresponding to the live broadcast channel ID, and saving, on the live broadcast proxy server, a correspondence among the dedicated network live broadcast channel ID, an IP address of the live broadcast server, and the live broadcast channel ID, where the proxy push-stream address includes the dedicated network address of the live broadcast proxy server and the dedicated network live broadcast channel ID; and the pushing the live broadcast data to the live broadcast server over an uplink of the dedicated network based on the proxy push-stream address is specifically: sending, by the live broadcast proxy client, the live broadcast data to the live broadcast proxy server based on the proxy push-stream address, so that the live broadcast proxy server stores the live broadcast data, and forwards and pushes the live broadcast data to the live broadcast server.

For a specific process, also refer to the first aspect of the present disclosure. Details are not described again.

According to a third aspect, an embodiment of the present disclosure provides a live broadcast method, where the method is applied to a live broadcast proxy management server, the live broadcast proxy management server is communicatively connected to devices in a dedicated network by using the dedicated network, the devices in the dedicated network include a live broadcast proxy client and a live broadcast proxy server, and the method includes: receiving, by the live broadcast proxy management server, a proxy push-stream request sent by the live broadcast proxy client, where the proxy push-stream request includes an IP address of a live broadcast server and a live broadcast channel ID; determining, by the live broadcast proxy management server, that the live broadcast proxy server exists in the dedicated network, where the live broadcast proxy server has both an IP address and a dedicated network address; creating, by the live broadcast proxy management server on the live broadcast proxy server, a dedicated network live broadcast channel ID corresponding to the live broadcast channel ID, and saving, on the live broadcast proxy server, a correspondence between the dedicated network live broadcast channel ID and a push-stream address; and returning, by the live broadcast proxy management server, a proxy push-stream address to the live broadcast proxy client, where the proxy push-stream address includes the dedicated network address of the live broadcast proxy server and the dedicated network live broadcast channel ID, so that the live broadcast proxy client pushes the live broadcast data to the live broadcast server over an uplink of the dedicated network.

For a specific process of executing the live broadcast method in this aspect, refer to a specific execution process of the live broadcast method in the first aspect of the present disclosure. Details are not described in this aspect.

According to a fourth aspect, an embodiment of the present disclosure provides a live broadcast system, where the live broadcast system includes a live broadcast proxy client and a live broadcast proxy management server, the live broadcast proxy client is communicatively connected to a live broadcast client by using a home network, and the live broadcast proxy client is communicatively connected to the live broadcast proxy management server by using a dedicated network.

The live broadcast proxy client is configured to: receive a proxy push-stream request sent by the live broadcast client, and forward the proxy push-stream request to the live broadcast proxy management server, where the proxy push-stream request includes a push-stream address, and the push-stream address includes an IP address of a live broadcast server; receive a proxy push-stream address returned by the live broadcast proxy management server, where the proxy push-stream address includes a dedicated network address of the live broadcast server; and receive live broadcast data sent by the live broadcast client, and push the live broadcast data to the live broadcast server over an uplink of the dedicated network based on the dedicated network address of the live broadcast server. For a specific execution process, refer to the specific execution process of the live broadcast proxy client in the first aspect of the embodiments of the present disclosure. Details are not described in this aspect.

The live broadcast proxy management server is configured to: receive the proxy push-stream request sent by the live broadcast proxy client; and determine, based on the push-stream address in the proxy push-stream request, that the live broadcast server has a corresponding dedicated network address in the dedicated network, and return the proxy push-stream address to the live broadcast proxy client.

For a specific execution process, refer to the specific execution process of the live broadcast proxy management server in the first aspect of the present disclosure. Details are not described in this aspect.

In a possible implementation, after receiving the proxy push-stream address sent by the live broadcast proxy management server, the live broadcast proxy client is further configured to send, to the live broadcast client, a response message that includes a dedicated network push-stream instruction parameter, where the dedicated network push-stream instruction parameter is used to instruct the live broadcast client to push the live broadcast data to the live broadcast server over the uplink of the dedicated network connected to the live broadcast proxy client.

According to a fifth aspect, an embodiment of the present disclosure provides a live broadcast system, where the live broadcast system includes a live broadcast proxy client, a live broadcast proxy server, and a live broadcast proxy management server, the live broadcast proxy client is communicatively connected to a live broadcast client by using a home network, and the live broadcast proxy client is communicatively connected to the live broadcast proxy management server and the live broadcast proxy server by using a dedicated network.

The live broadcast proxy client is configured to: receive a proxy push-stream request sent by the live broadcast client, where the proxy push-stream request includes a push-stream address, and the push-stream address includes an IP address of a live broadcast server and a live broadcast channel ID; forward the proxy push-stream request to the live broadcast proxy management server; receive a proxy push-stream address returned by the live broadcast proxy management server, where the proxy push-stream address includes a dedicated network address of the live broadcast proxy server and a dedicated network live broadcast channel ID; and receive live broadcast data sent by the live broadcast client, and push the live broadcast data to the live broadcast proxy server over an uplink of the dedicated network based on the dedicated network address of the live broadcast proxy server.

For a specific execution process, refer to the specific execution process of the live broadcast proxy client in the first aspect of the present disclosure. Details are not described in this aspect.

The live broadcast proxy management server is configured to: receive the proxy push-stream request sent by the live broadcast proxy client; determine that the live broadcast proxy server exists in the dedicated network, where the live broadcast proxy server has both an IP address and the dedicated network address; create, on the live broadcast proxy server, the dedicated network live broadcast channel ID corresponding to the live broadcast channel ID, and save, on the live broadcast proxy server, a correspondence between the dedicated network live broadcast channel ID and the push-stream address; and send the proxy push-stream address to the live broadcast proxy client.

For a specific execution process, refer to the specific execution process of the live broadcast proxy management server in the first aspect of the present disclosure. Details are not described in this aspect.

The live broadcast proxy server is configured to: receive the live broadcast data sent by the live broadcast proxy client, and forward the received live broadcast data to the live broadcast server based on the push-stream address.

For a specific execution process, refer to the specific execution process of the live broadcast proxy server in the first aspect of the present disclosure. Details are not described in this aspect.

In a possible implementation, after receiving the proxy push-stream address sent by the live broadcast proxy management server, the live broadcast proxy client is further configured to send, to the live broadcast client, a response message that includes a dedicated network push-stream instruction parameter, where the dedicated network push-stream instruction parameter is used to instruct the live broadcast client to push the live broadcast data to the live broadcast server over the uplink of the dedicated network connected to the live broadcast proxy client.

According to a sixth aspect, an embodiment of the present disclosure provides a live broadcast client. The live broadcast client has a function of implementing behavior of the live broadcast client in the first aspect. The function may be implemented by hardware or may be implemented by hardware executing corresponding software. The hardware or the software includes one or more modules corresponding to the foregoing function.

In a possible design, a structure of the live broadcast client includes a processor and a memory. The memory is configured to store a program that supports the client in performing the foregoing method. The processor is configured to execute the program stored in the memory. The client may further include a communications interface used for communication between the client and another device or a communications network.

According to a seventh aspect, an embodiment of the present disclosure provides a live broadcast proxy client. The live broadcast proxy client has a function of implementing behavior of the live broadcast proxy client in the second aspect. The function may be implemented by hardware or may be implemented by hardware executing corresponding software. The hardware or the software includes one or more modules corresponding to the foregoing function.

In a possible design, a structure of the live broadcast proxy client includes a processor and a memory. The memory is configured to store a program that supports the client in performing the foregoing method. The processor is configured to execute the program stored in the memory. The client may further include a communications interface used for communication between the client and another device or a communications network.

According to an eighth aspect, an embodiment of the present disclosure provides a live broadcast proxy management server. The live broadcast proxy management server has a function of implementing behavior of the live broadcast proxy management server in the third aspect. The function may be implemented by hardware or may be implemented by hardware executing corresponding software. The hardware or the software includes one or more modules corresponding to the foregoing function.

In a possible design, a structure of the live broadcast proxy management server includes a processor and a memory. The memory is configured to store a program that supports the server in performing the foregoing method. The processor is configured to execute the program stored in the memory. The server may further include a communications interface used for communication between the client and another device or a communications network.

According to a ninth aspect, an embodiment of the present disclosure further provides a computer-readable storage medium, where the computer-readable storage medium stores an instruction, and the instruction is used to perform the methods according to the first aspect to the third aspect of the present disclosure.

According to a tenth aspect, an embodiment of the present disclosure further provides a computer program product. When the computer program is executed, the computer program product is used to perform the method performed by the live broadcast client, the live broadcast proxy client, or the live broadcast proxy management server described in the foregoing aspects.

According to an eleventh aspect, an embodiment of the present disclosure further provides a live broadcast system. The live broadcast system includes a live broadcast client, a live broadcast proxy client, a live broadcast management server, a live broadcast server, and a live broadcast proxy management server. The live broadcast client is communicatively connected to the live broadcast proxy client by using a home network, the live broadcast client is communicatively connected to the live broadcast management server and the live broadcast server by using an Internet, and the live broadcast proxy client is communicatively connected to the live broadcast server and the live broadcast proxy management server by using a dedicated network.

The live broadcast client is configured to: receive a push-stream address sent by the live broadcast management server, where the push-stream address includes an IP address of the live broadcast server; send a proxy push-stream request to the live broadcast proxy client, where the proxy push-stream request includes the push-stream address; and collect live broadcast data and send the live broadcast data to the live broadcast proxy client.

The live broadcast proxy client is configured to: receive the proxy push-stream request sent by the live broadcast client and forward the proxy push-stream request to the live broadcast proxy management server; receive a proxy push-stream address returned by the live broadcast management server, where the proxy push-stream address includes a dedicated network address of the live broadcast server; and receive the live broadcast data sent by the live broadcast client and push the live broadcast data to the live broadcast server over an uplink of the dedicated network based on the dedicated network address of the live broadcast server.

The live broadcast proxy management server is configured to: receive the proxy push-stream request sent by the live broadcast proxy client; and determine that the live broadcast server has a corresponding dedicated network address in the dedicated network, and return the proxy push-stream address to the live broadcast proxy client.

The live broadcast server is configured to receive the live broadcast data sent by the live broadcast proxy client.

In a possible implementation, the live broadcast proxy client is further configured to: after receiving the proxy push-stream address sent by the live broadcast proxy management server, send, to the live broadcast client, a response message that includes a dedicated network push-stream instruction parameter, where the dedicated network push-stream instruction parameter is used to indicate that a live broadcast server having both an IP address and a dedicated network address exists in the dedicated network.

For specific execution details of the related steps, refer to the foregoing related descriptions. Details are not described herein again.

According to a twelfth aspect, an embodiment of the present disclosure further provides a live broadcast system. The live broadcast system includes a live broadcast client, a live broadcast proxy client, a live broadcast server, a live broadcast management server, a live broadcast proxy server, and a live broadcast proxy management server. The live broadcast client is communicatively connected to the live broadcast proxy client by using a home network and is communicatively connected to the live broadcast management server and the live broadcast server by using an Internet, the live broadcast proxy client is communicatively connected to the live broadcast proxy management server and the live broadcast proxy server by using a dedicated network, and the live broadcast proxy server is communicatively connected to the live broadcast server by using the Internet.

The live broadcast client is configured to: receive a push-stream address sent by the live broadcast management server, where the push-stream address includes an IP address of the live broadcast server and a live broadcast channel ID; send a proxy push-stream request to the live broadcast proxy client, where the proxy push-stream request includes the push-stream address; and collect live broadcast data and send the live broadcast data to the live broadcast proxy client.

The live broadcast proxy client is configured to: receive the proxy push-stream request sent by the live broadcast client and forward the proxy push-stream request to the live broadcast proxy management server; receive a proxy push-stream address returned by the live broadcast management server, where the proxy push-stream address includes a dedicated network address of the live broadcast proxy server and a dedicated network live broadcast channel ID; and receive the live broadcast data sent by the live broadcast client and push the live broadcast data to the live broadcast proxy server over an uplink of the dedicated network based on the dedicated network address of the live broadcast proxy server.

The live broadcast proxy management server is configured to: receive the proxy push-stream request sent by the live broadcast proxy client; determine that the live broadcast proxy server exists in the dedicated network, where the live broadcast proxy server has both an IP address and the dedicated network address; create, on the live broadcast proxy server, the dedicated network live broadcast channel ID corresponding to the live broadcast channel ID, and save, on the live broadcast proxy server, a correspondence between the dedicated network live broadcast channel ID and the push-stream address; and send the proxy push-stream address to the live broadcast proxy client.

The live broadcast proxy server is configured to: receive the live broadcast data sent by the live broadcast proxy client, and forward the received live broadcast data to the live broadcast server.

The live broadcast server is configured to receive the live broadcast data sent by the live broadcast proxy server.

In a possible implementation, the live broadcast proxy client is further configured to: after receiving the proxy push-stream address sent by the live broadcast proxy management server, send, to the live broadcast client, a response message that includes a dedicated network push-stream instruction parameter, where the dedicated network push-stream instruction parameter is used to indicate that a live broadcast server having both an IP address and a dedicated network address exists in the dedicated network.

For specific execution details of the related steps, refer to the foregoing related descriptions. Details are not described herein again.

According to the foregoing provided live broadcast method and system, and related device, the live broadcast client can push the live broadcast data to the live broadcast server over the uplink of the dedicated network by performing the live broadcast method. Further, a live broadcast can further be watched in the dedicated network. The dedicated network in the embodiments may be a bearer network that implements a service such as digital television interaction, and may be a manageable and guaranteed local area network that implements management, control, and guarantying of a dedicated network service. In addition, the dedicated network has a QoS guarantee, and an uplink bandwidth of the dedicated network is relatively large, thereby effectively avoiding a case in which the live broadcast client gets offline. Therefore, a probability of successful live broadcast data transmission is increased, and the live broadcast data has high image quality and a low latency. Therefore, the live broadcast method in the embodiments can provide high-definition or even 4K/8K video quality.

BRIEF DESCRIPTION OF DRAWINGS

FIG. 9A to FIG. 9D are a flowchart of step execution of an application scenario of an embodiment of a live broadcast method according to the present disclosure;

FIG. 12A to FIG. 12C are a flowchart of step execution of an application scenario of another embodiment of a live broadcast method according to the present disclosure;

DESCRIPTION OF EMBODIMENTS

Embodiments of the present disclosure provide a live broadcast method. The method in the embodiments is based on a live broadcast system provided in the embodiments.

Figure 1:
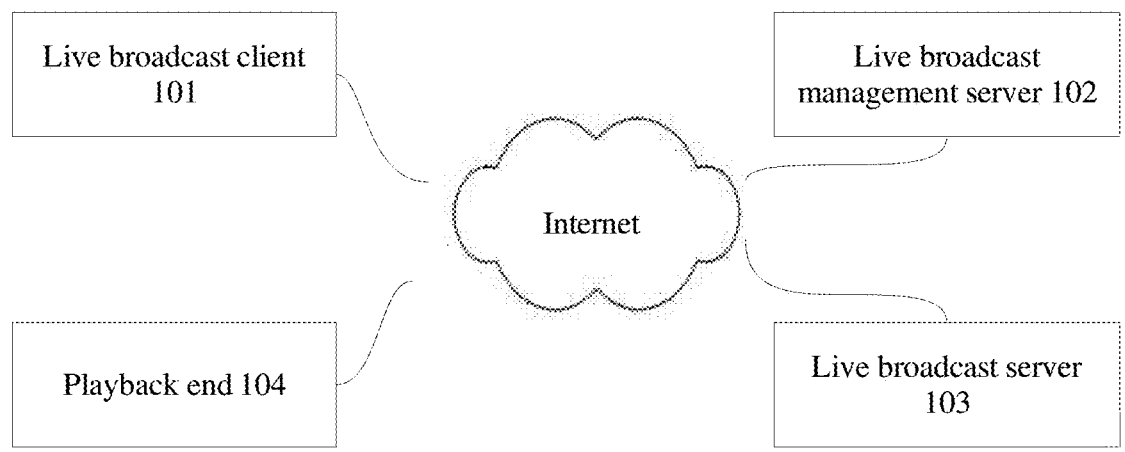
FIG. 1 is a schematic structural diagram of a live broadcast network.
Figure 2:
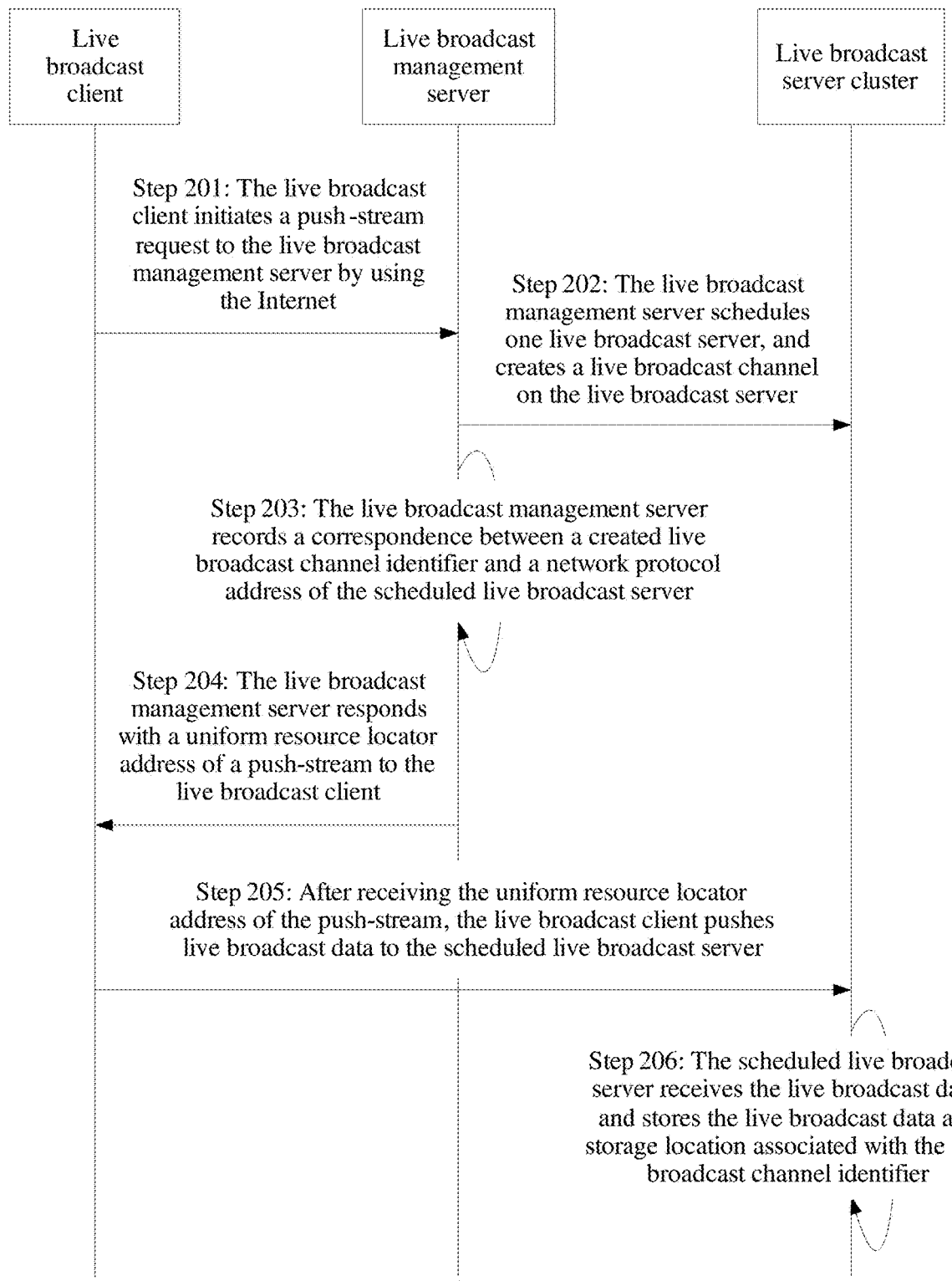
FIG. 2 is a flowchart of steps of live broadcast releasing.
Figure 3:
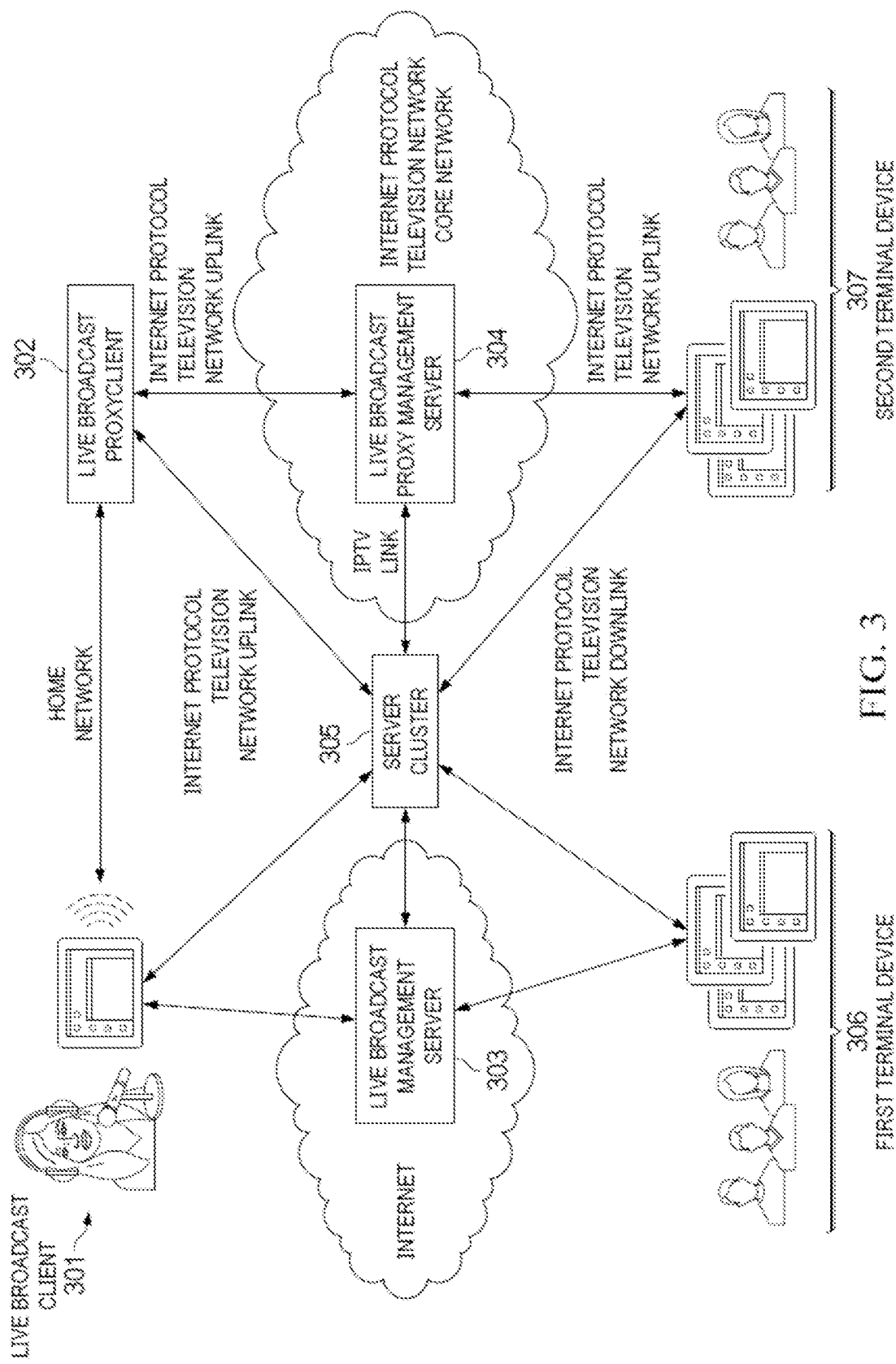
FIG. 3 is a schematic structural diagram of an embodiment of a live broadcast system according to the present disclosure.

For a structure of the live broadcast system provided in the embodiments, refer to FIG. 3. FIG. 3 is a schematic structural diagram of an embodiment of a live broadcast system according to the present disclosure.

As shown in FIG. 3, the live broadcast system in this embodiment includes: a live broadcast client 301, a live broadcast proxy client 302, a live broadcast management server 303, a server cluster 305, and a live broadcast proxy management server 304; and optionally, further includes a first terminal device 306 and a second terminal device 307.

Specifically, the live broadcast client 301 is configured to collect live broadcast data.

Optionally, the live broadcast data in this embodiment may be video data, voice data, text data, picture data, or the like. This is not specifically limited in this embodiment.

The live broadcast client 301 in this embodiment is communicatively connected to the live broadcast proxy client 302 by using a home network, and the live broadcast client 301 is communicatively connected to the live broadcast management server 303 and the server cluster 305 by using an Internet.

Specifically, the home network may be a mobile network, a wireless local area network, a Bluetooth network, or the like. Descriptions of the home network in this embodiment are an optional example, and impose no limitation. For example, the live broadcast client 301 may access the Internet by using a home gateway (such as a router) and is communicatively connected to the live broadcast management server 303 and the server cluster 305 on the Internet. The live broadcast client 301 in this embodiment may be any terminal on which live broadcast software is installed, such as a mobile phone, a tablet, or a computer.

The live broadcast proxy client 302 is further communicatively connected to the live broadcast proxy management server 304 and the server cluster 305 by using a dedicated network. Specifically, for example, the dedicated network is the Internet Protocol television (IPTV) network in this embodiment. The live broadcast proxy client 302 may be a client in the dedicated network, for example, may be a set top box STB. It should be noted that in the system in this embodiment, there is a QoS guarantee on an uplink of the dedicated network between the live broadcast proxy client 302 and the server cluster 305.

Descriptions of the dedicated network in this embodiment are an optional example and impose no limitation. For example, the dedicated network in this embodiment may alternatively be any network that has a QoS guarantee on an uplink.

This embodiment is described by using an example in which the server cluster 305 includes a plurality of live broadcast servers. A specific quantity of live broadcast servers included in the server cluster 305 is not limited in this embodiment.

The live broadcast management server 303 accesses the Internet, that is, in this embodiment, the live broadcast management server 303 is interconnected to the live broadcast client 301 by using the Internet, and the live broadcast management server 303 in this embodiment is further connected to any live broadcast server in the server cluster 305.

A live broadcast server included in the server cluster 305 in this embodiment accesses both the Internet and the dedicated network, and the live broadcast server that accesses both the Internet and the dedicated network may have both one IP address and one dedicated network address.

The live broadcast proxy management server 304 and the live broadcast management server 303 in this embodiment access only the Internet.

In this embodiment of the present disclosure, because the live broadcast server accesses both the Internet and the dedicated network, a user may obtain live broadcast data by using different networks. For example, the first terminal device 306 in this embodiment is communicatively connected to the live broadcast management server 303 and the server cluster 305 by using the Internet, so as to obtain live broadcast data stored on the live broadcast server; and the second terminal device 307 is communicatively connected to the live broadcast proxy management server 304 and the server cluster 305 by using the dedicated network, so as to obtain the live broadcast data stored on the live broadcast server.

Figure 4:
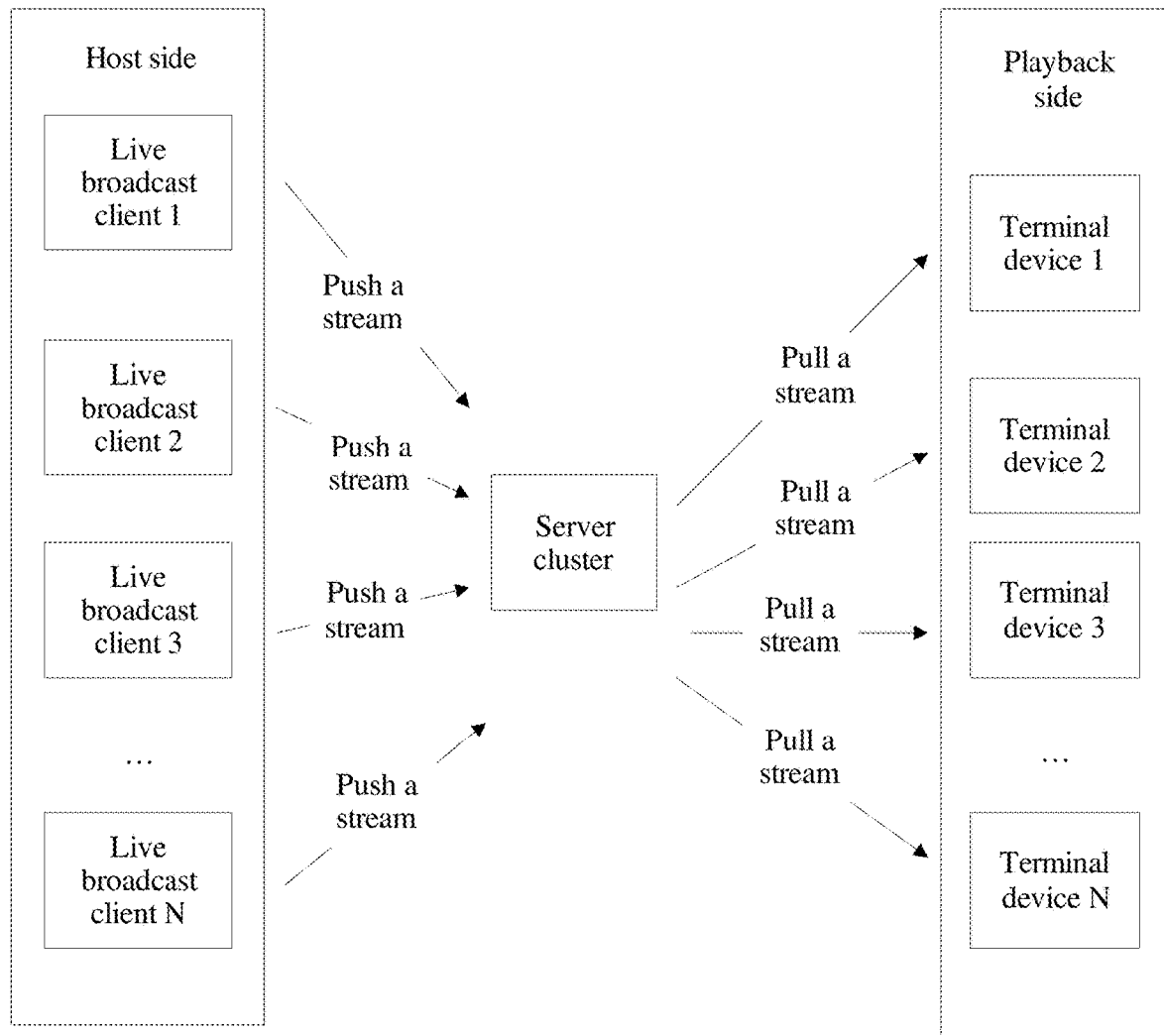
FIG. 4 is a schematic diagram of embodiment execution of a live broadcast method according to the present disclosure.

The following provides an overview of a live broadcast process with reference to FIG. 3 and FIG. 4.

As shown in FIG. 4, to implement normal view of live broadcast data, a live broadcast method is divided into a stream pushing process of live broadcast data and a stream pulling process of live broadcast data.

Through the stream pushing process of live broadcast data, a live broadcast client pushes collected live broadcast data to a live broadcast server in a server cluster.

Through the stream pulling process of live broadcast data, a terminal device can obtain live broadcast data stored in a live broadcast server, so that live broadcast data can be watched on the terminal device.

Referring to FIG. 3, a stream pushing process of live broadcast data may be as follows:

The live broadcast client 301 may obtain a push-stream address from the live broadcast management server 303 over an uplink channel of the Internet. The push-stream address includes an IP address of a live broadcast server located in the server cluster 305. The live broadcast client 301 sends the push-stream address to the live broadcast proxy client 302 by using the home network, and the live broadcast proxy client 302 may send, to the live broadcast proxy management server 304 over the uplink of the dedicated network, a proxy push-stream request that includes the push-stream address. In this way, the live broadcast proxy client 302 obtains, by using the proxy push-stream request, a dedicated network address that is of the live broadcast server and that is sent by the live broadcast proxy management server 304.

When the live broadcast client 301 makes a live broadcast, the live broadcast client 301 sends collected live broadcast data to the live broadcast proxy client 302 by using the home network, and the live broadcast proxy client 302 sends the live broadcast data to the determined live broadcast server over the uplink of the dedicated network based on the dedicated network address.

A stream pulling process of the live broadcast data may be as follows: The first terminal device 306 accessing the Internet can obtain, by using the Internet, the live broadcast data stored on the live broadcast server, and the second terminal device 307 accessing the dedicated network can obtain, by using the dedicated network, the live broadcast data stored on the live broadcast server.

It can be learned that the live broadcast system in this embodiment can release the live broadcast data both on the Internet and the dedicated network, so that each of terminal devices accessing different networks can obtain the live broadcast data. Moreover, the live broadcast system in this embodiment can release the live broadcast data to the live broadcast server over the uplink of the dedicated network that has a QoS guarantee and a high bandwidth, so that the second terminal device 307 accessing the dedicated network can pull a stream from the server cluster 305 to play the live broadcast data. Because the dedicated network has a QoS guarantee, the second terminal device 307 accessing the dedicated network can obtain live broadcast data with a high-quality image and a low latency.

The descriptions of the live broadcast system in FIG. 3 are an optional example and impose no limitation. The following provides example descriptions of another structure of a live broadcast system provided in the present disclosure, with reference FIG. 5.

Figure 5:
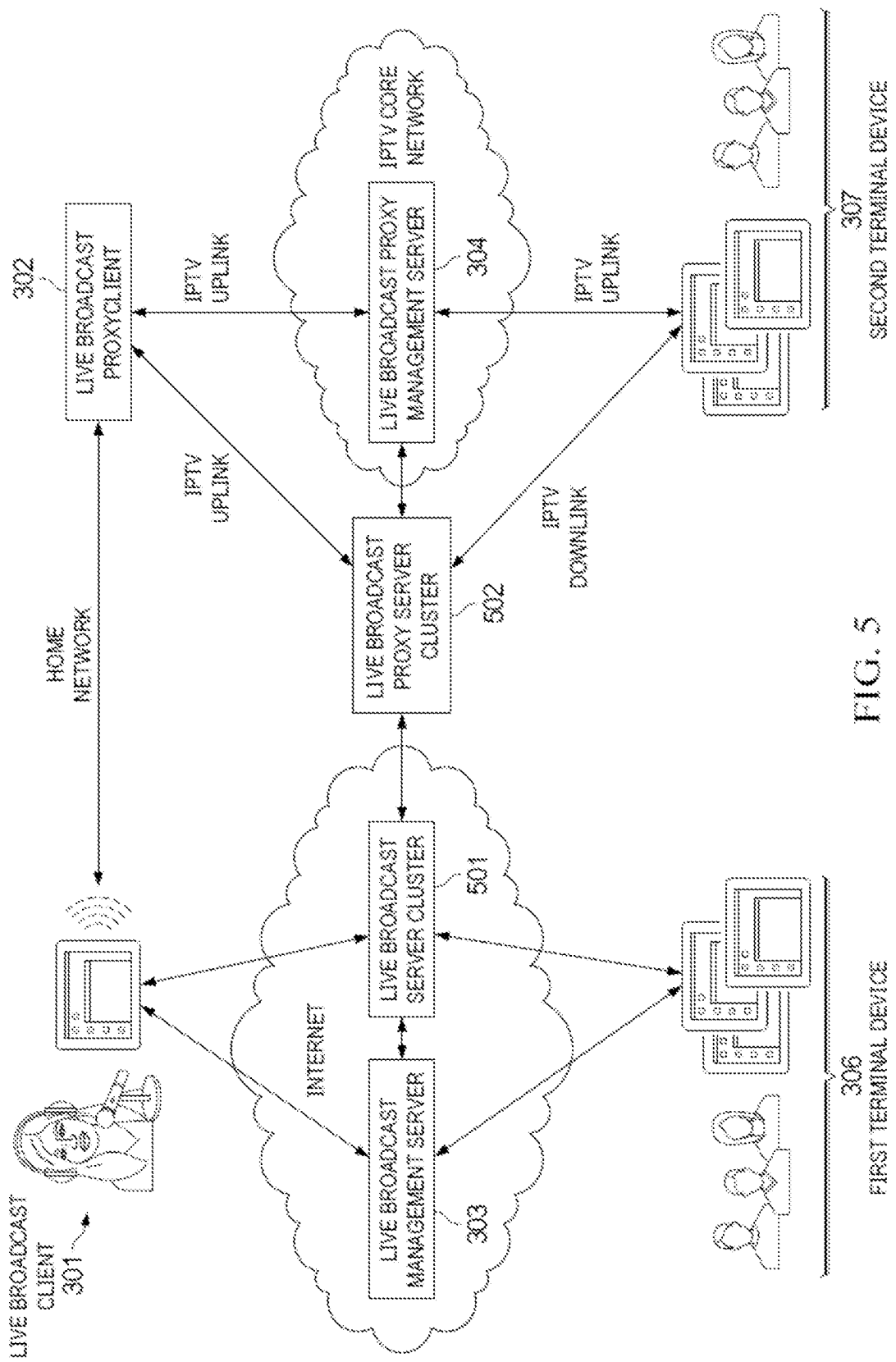
FIG. 5 is a schematic structural diagram of another embodiment of a live broadcast system according to the present disclosure.

Compared with the live broadcast system shown in FIG. 3, a live broadcast system shown in FIG. 5 in this embodiment describes how to push the live broadcast data by using the dedicated network when the live broadcast server accesses only the Internet.

A server cluster included in the live broadcast system in this embodiment includes a live broadcast server cluster 501 and a live broadcast proxy server cluster 502. The live broadcast server cluster 501 includes a plurality of live broadcast servers, and the live broadcast proxy server cluster 502 includes a plurality of live broadcast proxy servers. This embodiment imposes no limitation on a specific quantity of live broadcast servers included in the live broadcast server cluster 501 and a specific quantity of live broadcast proxy servers included in the live broadcast proxy server cluster 502.

In this embodiment, the live broadcast server cluster 501 accesses only the Internet, and the live broadcast proxy server cluster 502 accesses both the Internet and the dedicated network.

For detailed descriptions of the live broadcast client 301, the live broadcast proxy client 302, the live broadcast management server 303, the live broadcast proxy management server 304, the first terminal device 306, and the second terminal device 307 that are included in the live broadcast system shown in FIG. 5, refer to FIG. 3. Details are not described in this embodiment.

The live broadcast server cluster 501 and the live broadcast proxy server cluster 502 in this embodiment are interconnected by using the Internet, so as to forward live broadcast data.

The second terminal device 307 in this embodiment is interconnected to the live broadcast proxy management server 304 and the live broadcast proxy server cluster 502 by using the dedicated network, so as to view live broadcast data by using a dedicated network link.

In the live broadcast system shown in FIG. 3, network connections between deployed live broadcast servers in a live network need to be updated. In particular, some live broadcast servers may be unable to access both the Internet and the dedicated network. To avoid impact on the deployed live broadcast servers in the live network, the live broadcast system in FIG. 5 provides a possible alternative solution: The live broadcast proxy server cluster 502 is deployed in the live broadcast system. A live broadcast proxy server in the live broadcast proxy server cluster 502 accesses both the Internet and the dedicated network. The live broadcast proxy server in the live broadcast proxy server cluster 502 is communicatively connected to the live broadcast server in the live broadcast server cluster 501 by using the Internet, and is communicatively connected to the live broadcast proxy client 302 and the live broadcast management server 304 by using the dedicated network. For an overview of the live broadcast process, refer to the following.

Referring to FIG. 5, a stream pushing process of the live broadcast data may be as follows:

The live broadcast client 301 may obtain a push-stream address from the live broadcast management server 303 by using the Internet. The push-stream address includes an IP address of any live broadcast server located in the live broadcast server cluster 501 and a live broadcast channel ID. The live broadcast client 301 sends the push-stream address to the live broadcast proxy client 302 by using the home network. The live broadcast proxy client 302 may send a proxy push-stream request that includes the push-stream address, to the live broadcast proxy management server 304 over an uplink of the dedicated network. The live broadcast proxy management server 304 schedules one live broadcast proxy server in the live broadcast proxy server cluster 502 to receive a subsequent push-stream from the live broadcast proxy client 302.

When the live broadcast client 301 makes a live broadcast, the live broadcast client 301 sends collected live broadcast data to the live broadcast proxy client 302 by using the home network, the live broadcast proxy client 302 sends the live broadcast data to the determined live broadcast proxy server over the uplink of the dedicated network based on a dedicated network address of the live broadcast proxy server, and the live broadcast proxy server forwards the obtained live broadcast data to the live broadcast server based on the IP address of the live broadcast server.

A stream pulling process of the live broadcast data may be as follows: The first terminal device 306 accessing the Internet can obtain, by using the Internet, the live broadcast data stored on the live broadcast server, and the second terminal device 307 accessing the dedicated network can obtain, over the uplink of the dedicated network, the live broadcast data stored on the live broadcast proxy server.

It can be learned that the live broadcast system in this embodiment can release the live broadcast data both on the Internet and in the dedicated network, so that each of terminal devices accessing different networks can obtain the live broadcast data. Moreover, the live broadcast system in this embodiment can release the live broadcast data to the live broadcast proxy server over the uplink of the dedicated network that has a QoS guarantee and a high bandwidth, so that the second terminal device 307 accessing the dedicated network can pull a stream from the live broadcast proxy server cluster 502 to play the live broadcast data. Because the dedicated network has a QoS guarantee, the second terminal device 307 accessing the dedicated network can obtain live broadcast data with a high-quality image and a low latency.

Figure 6A:
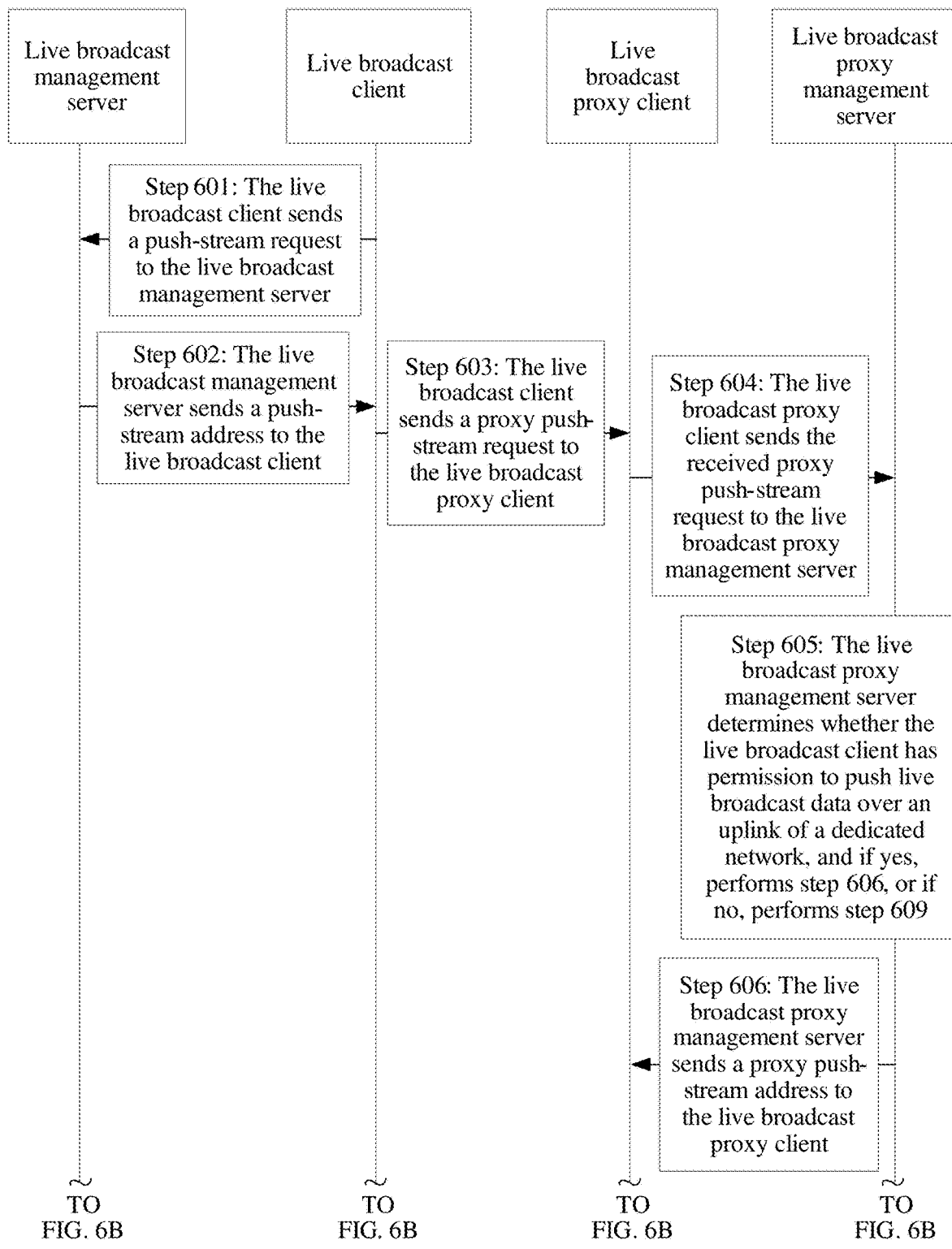
FIG. 6A and FIG. 6B are a flowchart of step execution of an embodiment of a live broadcast method according to the present disclosure.

Based on the live broadcast system shown in FIG. 3, the following describes in detail specific execution processes of live broadcast methods in embodiments of the present disclosure with reference to FIG. 6A to FIG. 9D. FIG. 6A and FIG. 6B describe in detail a specific process in which a live broadcast client determines to push a stream of live broadcast data by using a dedicated network and a specific process in which the live broadcast client determines to push the stream of the live broadcast data by using the Internet, in the live broadcast method provided in this embodiment of the present disclosure.

Figure 6B:
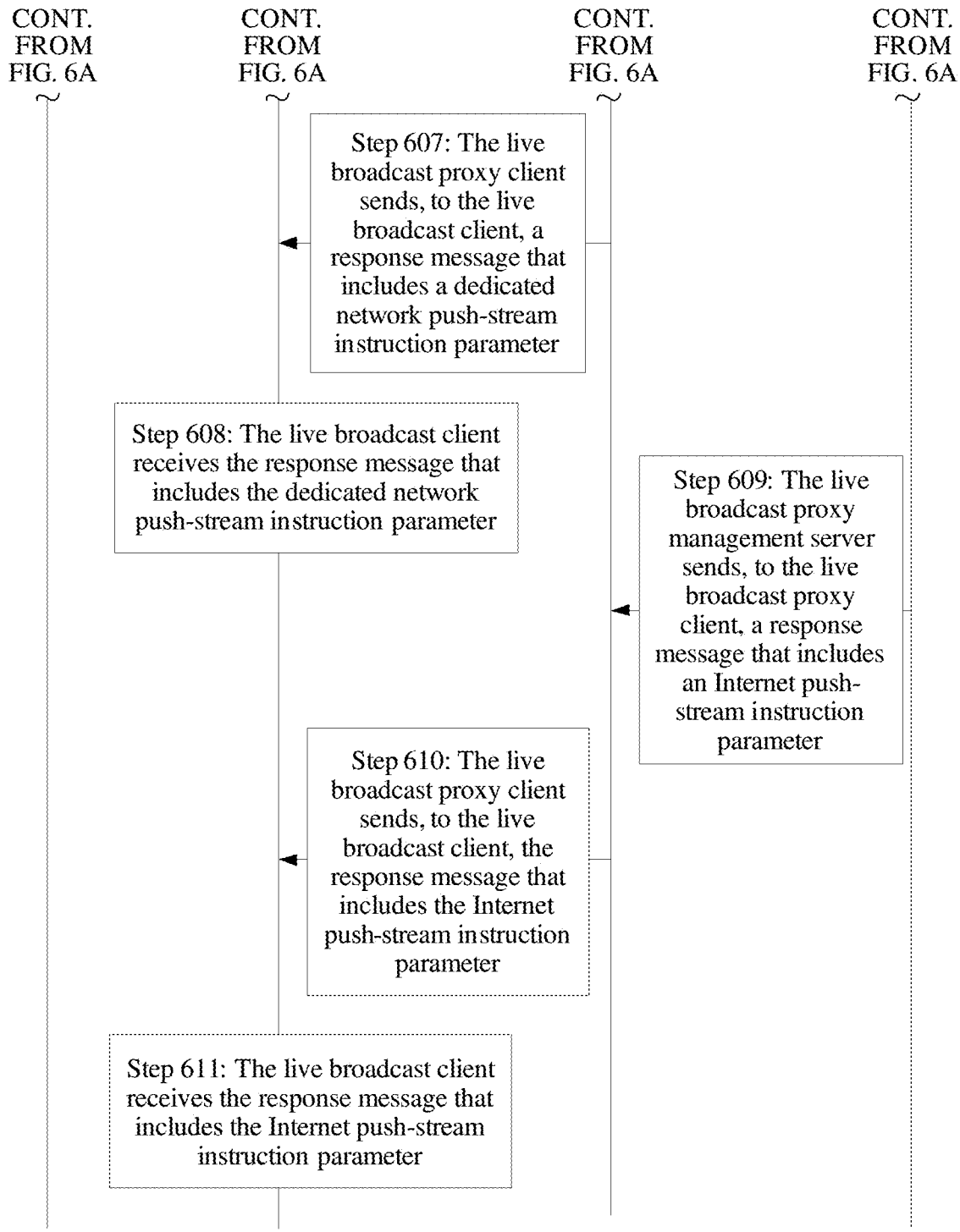

As shown in FIG. 6A and FIG. 6B, the live broadcast method specifically includes the following steps.

Step 601: The live broadcast client sends a push-stream request to the live broadcast management server.

Specifically, the live broadcast client may request a push-stream of live broadcast data from the live broadcast management server by using the push-stream request. This step is the same as in other approaches. For details, refer to those other approaches. Details are not described again.

Step 602: The live broadcast management server sends a push-stream address to the live broadcast client.

Specifically, after the live broadcast management server in this embodiment receives the push-stream request, the live broadcast management server may perform authentication on an identity of a host to which the live broadcast client belongs. After authentication succeeds, the live broadcast management server may schedule one live broadcast server as a target live broadcast server from the server cluster shown in FIG. 3, and the target live broadcast server is used to receive the live broadcast data pushed by the live broadcast client.

Specifically, the live broadcast management server may schedule, by using a preset scheduling policy, a live broadcast server located in the server cluster, so as to determine, in the server cluster, the target live broadcast server used to receive the live broadcast data.

The following provides example descriptions about how to perform authentication on the identity of the host.

Optionally, before the live broadcast method in this embodiment is performed, the host may register with the live broadcast management server by using the live broadcast client. To be specific, the host may enter registration information such as an account name and a password by using the live broadcast client, and the live broadcast management server may store the registration information. After receiving the push-stream request, the live broadcast management server may obtain the registration information carried in the push-stream request. The live broadcast management server may determine whether the registration information entered by the host is consistent with the registration information stored on the live broadcast management server. If the registration information entered by the host is consistent with the registration information stored on the live broadcast management server, it indicates that authentication on the identity of the host succeeds.

It should be noted that descriptions of a process of performing authentication on the identity of the host in this embodiment are an optional example and impose no limitation.

The following provides example descriptions of the scheduling policy.

The scheduling policy in this embodiment may be as follows: The live broadcast management server determines a live broadcast server closest to the live broadcast client as the target live broadcast server. Alternatively, the scheduling policy may be as follows: The live broadcast management server determines a live broadcast server whose load is less than a preset value, as the target live broadcast server.

It should be noted that the descriptions of the scheduling policy in this embodiment are an optional example and impose no limitation.

The live broadcast management server creates a live broadcast channel on the target live broadcast server and obtains a live broadcast channel ID of the created live broadcast channel and a storage location corresponding to the live broadcast channel ID. The storage location is used to store live broadcast data.

The push-stream address generated by the live broadcast management server includes an IP address of the target live broadcast server and the live broadcast channel ID.

Step 603: The live broadcast client sends a proxy push-stream request to a live broadcast proxy client.

Specifically, the proxy push-stream request is used to request to push the live broadcast data by using the dedicated network.

More specifically, the proxy push-stream request includes the push-stream address.

Step 604: The live broadcast proxy client sends the received proxy push-stream request to a live broadcast proxy management server.

The proxy push-stream request in this step includes the push-stream address. After receiving the proxy push-stream request, the live broadcast proxy management server in this embodiment may store the IP address of the target live broadcast server and the live broadcast channel ID that are included in the proxy push-stream request.

Step 605: The live broadcast proxy management server determines whether the live broadcast client has permission to push live broadcast data over an uplink of the dedicated network, and if yes, performs step 606; or if no, performs step 609.

In a possible implementation, if it is learned that the scheduled target live broadcast server has a dedicated network address, the live broadcast proxy management server in this embodiment may determine that the live broadcast client has permission to push live broadcast data over the uplink of the dedicated network. If it is determined that the scheduled target live broadcast server does not have a dedicated network address, the live broadcast proxy management server in this embodiment may determine that the live broadcast client does not have permission to push live broadcast data over the uplink of the dedicated network.

Specifically, the dedicated network address in this embodiment is an address of the target live broadcast server in the dedicated network.

The following describes how the live broadcast proxy management server obtains the dedicated network address.

Specifically, after receiving the proxy push-stream request, the live broadcast proxy management server may parse out the IP address of the target live broadcast server from the proxy push-stream request.

The live broadcast proxy management server obtains an address mapping table stored on the live broadcast proxy management server, and the live broadcast proxy management server may query, by using the address mapping table, the dedicated network address corresponding to the Internet protocol address of the target live broadcast server.

The following describes the address mapping table in detail with reference to Table 1.

TABLE 1

Correspondence between an IP address and a dedicated network address of a live broadcast server

| IP address | Dedicated network address |
|---|---|
| 101.119.58.74 | 192.168.10.10 |

It can be learned from Table 1 that, in a possible case, the address mapping table stores address information of a live broadcast server that accesses both the Internet and the dedicated network, that is, a correspondence between an IP address and a dedicated network address of a live broadcast server that accesses both the Internet and the dedicated network is established in the address mapping table.

For example, in this embodiment, the live broadcast proxy management server may obtain, based on the proxy push-stream request, an IP address 101.119.58.74 of the target live broadcast server that is included in the proxy push-stream request. The live broadcast proxy management server may query the address mapping table shown in Table 1, to obtain a dedicated network address 192.168.10.10 of the live broadcast server that is corresponding to the IP address 101.119.58.74 of the target live broadcast server. When the live broadcast proxy management server obtains the dedicated network address, it indicates that the live broadcast client has permission to push live broadcast data over the uplink of the dedicated network, and the live broadcast proxy management server continues to perform step 606.

When the live broadcast proxy management server determines the dedicated network address corresponding to the IP address of the target live broadcast server, the live broadcast proxy management server may record a correspondence between the dedicated network address of the live broadcast server and the live broadcast channel ID.

That is, the live broadcast proxy management server in this embodiment may create Table 2 below:

TABLE 2

Correspondence between a live broadcast channel ID and a dedicated network address

| Live broadcast channel ID | Dedicated network address |
|---|---|
| A123456 | 192.168.10.10 |

It can be learned that after the live broadcast proxy management server in this embodiment determines that the dedicated network address corresponding to the IP address of the target live broadcast server is 192.168.10.10, the live broadcast proxy management server may create a correspondence between the live broadcast channel ID A123456 included in the proxy push-stream request and the dedicated network address 192.168.10.10.

Optionally, the live broadcast proxy management server in this embodiment may further perform authentication on the identity of the host.

If authentication on the identity of the host succeeds, and the live broadcast proxy management server learns that the scheduled target live broadcast server has a dedicated network address, the live broadcast proxy management server may determine that the live broadcast client has permission to push live broadcast data over the uplink of the dedicated network; or if authentication on the identity of the host does not succeed, and/or the live broadcast proxy management server learns that the scheduled target live broadcast server does not have a dedicated network address, the live broadcast proxy management server may determine that the live broadcast client does not have permission to push live broadcast data over the uplink of the dedicated network.

The following provides optional descriptions about how the live broadcast proxy management server specifically performs authentication on the identity of the host.

The live broadcast proxy management server in this embodiment includes a host identity authentication module, where the host identity authentication module can perform authentication on the identity of the host.

Specifically, the live broadcast client may receive verification information entered by the host, and the verification information may be information registered by the host such as a user name and a password. The verification information is not limited in this embodiment.

Optionally, the live broadcast client in this embodiment may send the verification information by using the proxy push-stream request. To be specific, the live broadcast client may send the proxy push-stream request that carries the verification information, to the live broadcast proxy client, so that the live broadcast proxy client forwards the proxy push-stream request that carries the verification information, to the live broadcast proxy management server.

Optionally, the live broadcast client in this embodiment may alternatively send the verification information to the live broadcast proxy client independently, so that the live broadcast proxy client forwards the verification information to the live broadcast proxy management server.

If the live broadcast proxy management server determines that the currently received verification information is the same as verification information stored on the live broadcast proxy management server, it indicates that the host has registered with the live broadcast proxy management server, and the live broadcast proxy management server may determine that authentication on the identity of the host succeeds.

It can be learned that, according to the method in this embodiment, only a live broadcast client that has been authenticated and that has permission to use the uplink of the dedicated network to push a stream can push a stream of live broadcast data over the uplink of the dedicated network, so as to facilitate management and control for behavior that the live broadcast client pushes a stream of live broadcast data by using the dedicated network, such as charging, and further help the live broadcast proxy management server to perform QoS control on live broadcast data.

Step 606: The live broadcast proxy management server sends a proxy push-stream address to the live broadcast proxy client.

Specifically, the proxy push-stream address includes the dedicated network address of the live broadcast server and the live broadcast channel ID.

Step 607: The live broadcast proxy client sends, to the live broadcast client, a response message that includes a dedicated network push-stream instruction parameter.

The dedicated network push-stream instruction parameter is used to instruct the live broadcast client to push the live broadcast data to the live broadcast server over the uplink of the dedicated network connected to the live broadcast proxy client.

More specifically, when the live broadcast proxy client in this embodiment determines that the proxy push-stream address is received, the live broadcast proxy client generates, based on the proxy push-stream address, the response message that includes the dedicated network push-stream instruction parameter.

Optionally, the dedicated network push-stream instruction parameter in this embodiment may be any character.

For example, the dedicated network push-stream instruction parameter in this embodiment may be a digit "1". When the dedicated network push-stream instruction parameter included in the response message is "1", it indicates that the live broadcast client can push the live broadcast data to the live broadcast server over the uplink of the dedicated network connected to the live broadcast proxy client.

Step 608: The live broadcast client receives the response message that includes the dedicated network push-stream instruction parameter.

The live broadcast client parses the response message to obtain the dedicated network push-stream instruction parameter included in the response message. When it is determined, based on the dedicated network push-stream instruction parameter, that the live broadcast data can be pushed over the uplink of the dedicated network in which the live broadcast proxy client is located, the live broadcast client may perform a step of pushing the live broadcast data to the live broadcast server over the uplink of the dedicated network connected to the live broadcast proxy client. For a specific execution process, refer to FIG. 7A and FIG. 7B.

Step 609: The live broadcast proxy management server sends, to the live broadcast proxy client, a response message that includes the Internet push-stream instruction parameter.

The Internet push-stream instruction parameter is used to instruct the live broadcast client to push the live broadcast data to the live broadcast server by using the Internet.

Optionally, the Internet push-stream instruction parameter in this embodiment may be any character.

For example, the Internet push-stream instruction parameter in this embodiment may be a digit "0". When the Internet push-stream instruction parameter included in the response message is "0", the live broadcast proxy client may instruct the live broadcast client to push the live broadcast data to the live broadcast server by using the Internet.

Step 610: The live broadcast proxy client sends, to the live broadcast client, the response message that includes the Internet push-stream instruction parameter.

When the live broadcast proxy client in this embodiment receives the response message that includes the Internet push-stream instruction parameter, the live broadcast proxy client may forward the response message to the live broadcast client.

Step 611: The live broadcast client receives the response message that includes the Internet push-stream instruction parameter.

The live broadcast client parses the response message to obtain the Internet push-stream instruction parameter included in the response message. When it is determined, based on the Internet push-stream instruction parameter, that the live broadcast client can push the live broadcast data to the live broadcast server by using the Internet, the live broadcast client may perform a step of pushing the live broadcast data to the live broadcast server by using the Internet. For a specific execution process, refer to FIG. 8A and FIG. 8B.

It can be learned that, according to the live broadcast method shown in FIG. 6A and FIG. 6B, the live broadcast client can determine to push the live broadcast data over the uplink of the dedicated network or push the live broadcast data over an uplink of the Internet, thereby effectively ensuring that the live broadcast client can push the live broadcast data to the live broadcast server successfully, and further effectively avoiding a failure of live broadcast data pushing.

Figure 7A:
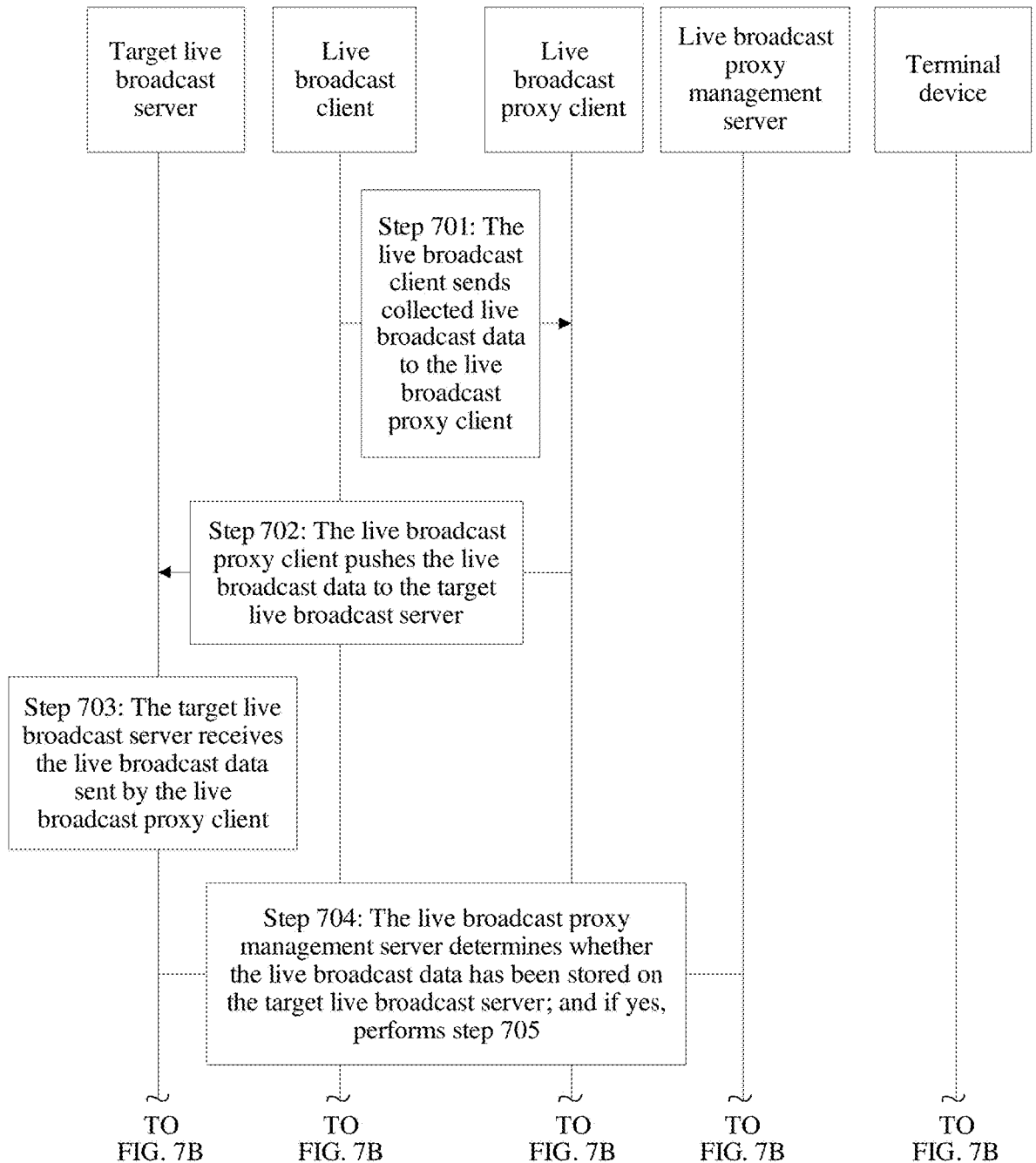
FIG. 7A and FIG. 7B are a flowchart of step execution of another embodiment of a live broadcast method according to the present disclosure.
Figure 7B:
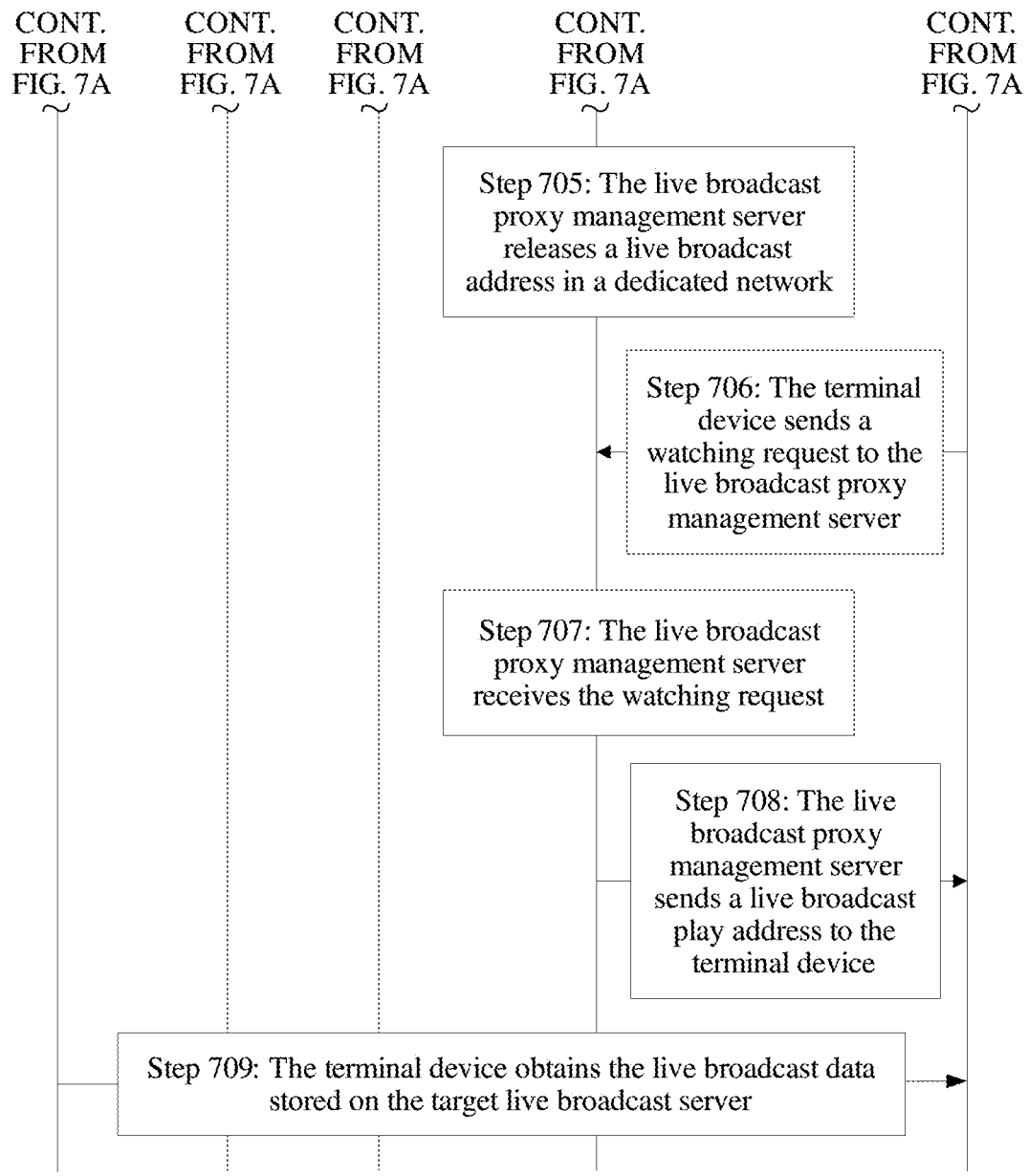

Based on the live broadcast method shown in FIG. 6A and FIG. 6B, the following describes a specific process in which the live broadcast client pushes the live broadcast data to the live broadcast server over the uplink of the dedicated network connected to the live broadcast proxy client, with reference to FIG. 7A and FIG. 7B.

Step 701: The live broadcast client sends collected live broadcast data to the live broadcast proxy client.

In this embodiment, if the live broadcast client has received the response message that includes the dedicated network push-stream instruction parameter, the live broadcast client may send the collected live broadcast data to the live broadcast proxy client based on the dedicated network push-stream instruction parameter.

For a specific process in which the live broadcast client receives the response message that includes the dedicated network push-stream instruction parameter, refer to FIG. 6A and FIG. 6B. Details are not described in this embodiment.

Step 702: The live broadcast proxy client pushes the live broadcast data to the target live broadcast server.

It can be learned from the foregoing description that the proxy push-stream address received by the live broadcast proxy client includes the dedicated network address of the live broadcast server and the live broadcast channel ID, and the live broadcast proxy client in this embodiment may send the live broadcast data to the target live broadcast server based on the proxy push-stream address.

Specifically, the live broadcast proxy client in this embodiment can send, over the uplink of the dedicated network with a high bandwidth and a QoS guarantee, the live broadcast data to the target live broadcast server that accesses both the Internet and the dedicated network, thereby reducing a latency and improving stream pushing efficiency.

Step 703: The target live broadcast server receives the live broadcast data sent by the live broadcast proxy client.

Specifically, the target live broadcast server in this embodiment receives the live broadcast data over the uplink of the dedicated network, and stores the live broadcast data at a storage location corresponding to the live broadcast channel ID.

Through execution of step 701 to step 703 in this embodiment, the live broadcast client can release the live broadcast data by using the dedicated network, that is, the stream pushing process shown in FIG. 4 is implemented.

This embodiment describes, by using the following steps, how to implement a stream pulling process of the live broadcast data shown in FIG. 4 on the target live broadcast server, so as to play the live broadcast data.

Step 704: The live broadcast proxy management server determines whether the live broadcast data has been stored on the target live broadcast server; and if yes, performs step 705.

The live broadcast proxy management server in this embodiment may query, by using the dedicated network link, whether the live broadcast data has been stored on the target live broadcast server. If the live broadcast proxy management server determines that the live broadcast data has been stored on the target live broadcast server, the live broadcast proxy management server continues to perform step 705.

Step 705: The live broadcast proxy management server releases a live broadcast address in the dedicated network.

When the live broadcast data has been stored on the target live broadcast server, the live broadcast proxy management server may release the live broadcast address.

The live broadcast address includes an address of the live broadcast proxy management server and the live broadcast channel ID.

Specifically, the address of the live broadcast proxy management server is an address of the live broadcast proxy management server in the dedicated network.

Optionally, the live broadcast proxy management server in this embodiment may release the live broadcast address by using an electronic program guide (EPG).

Step 706: A terminal device sends a watching request to the live broadcast proxy management server.

Specifically, the terminal device in this embodiment is the second terminal device 307 shown in FIG. 3. The second terminal device 307 may send, to the live broadcast proxy management server over the uplink of the dedicated network, the watching request used for requesting the live broadcast data.

Specifically, the watching request includes the live broadcast channel ID.

Step 707: The live broadcast proxy management server receives the watching request.

Step 708: The live broadcast proxy management server sends a live broadcast play address to the terminal device.

It can be learned from step 605 shown in FIG. 6A that the live broadcast proxy management server has saved the correspondence between the live broadcast channel ID and the dedicated network address of the live broadcast server. In this embodiment, when the live broadcast proxy management server obtains the live broadcast channel ID included in the watching request, the live broadcast proxy management server may determine the dedicated network address corresponding to the live broadcast channel ID.

The live broadcast proxy management server generates the live broadcast play address. The live broadcast play address includes the live broadcast channel ID and the dedicated network address of the live broadcast server.

Step 709: The terminal device obtains the live broadcast data stored on the target live broadcast server.

Specifically, the terminal device in this embodiment can be interconnected to the target live broadcast server based on the live broadcast play address, so that the terminal device can obtain, based on the live broadcast play address, the live broadcast data stored at the storage location corresponding to the live broadcast channel ID. In this way, the live broadcast data can be played on the terminal device.

It can be learned that in the live broadcast method shown in FIG. 7A and FIG. 7B, the live broadcast client can push, over the uplink of the dedicated network, the live broadcast data to the target live broadcast server that accesses both the Internet and the dedicated network. The uplink of the dedicated network in this embodiment has a QoS guarantee and a high bandwidth. Therefore, in a process of pushing the live broadcast data to the live broadcast server over the uplink of the dedicated network, a latency in a stream pushing process is reduced, and stream pushing efficiency is improved.

Figure 8A:
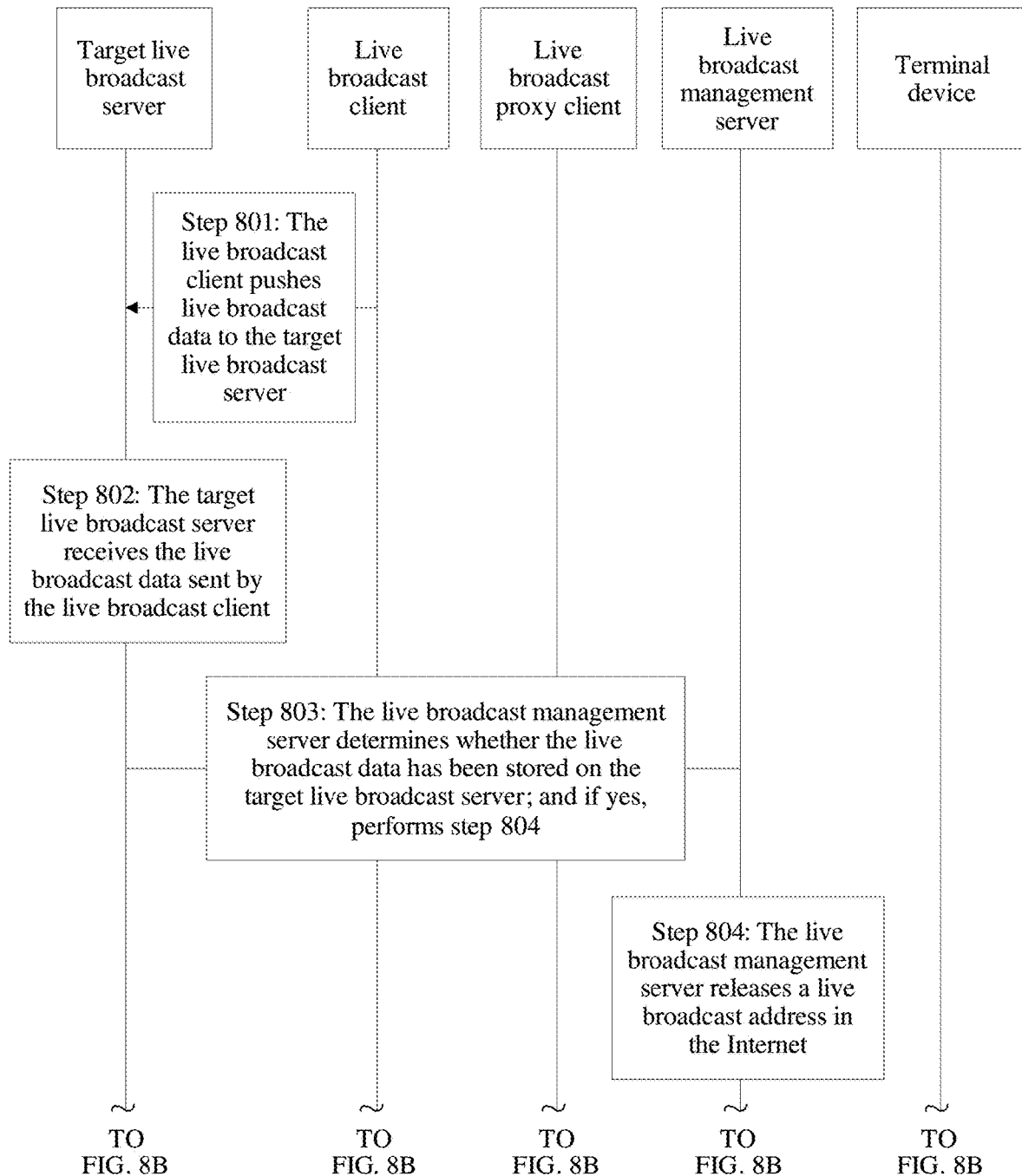
FIG. 8A and FIG. 8B are a flowchart of step execution of another embodiment of a live broadcast method according to the present disclosure.
Figure 8B:
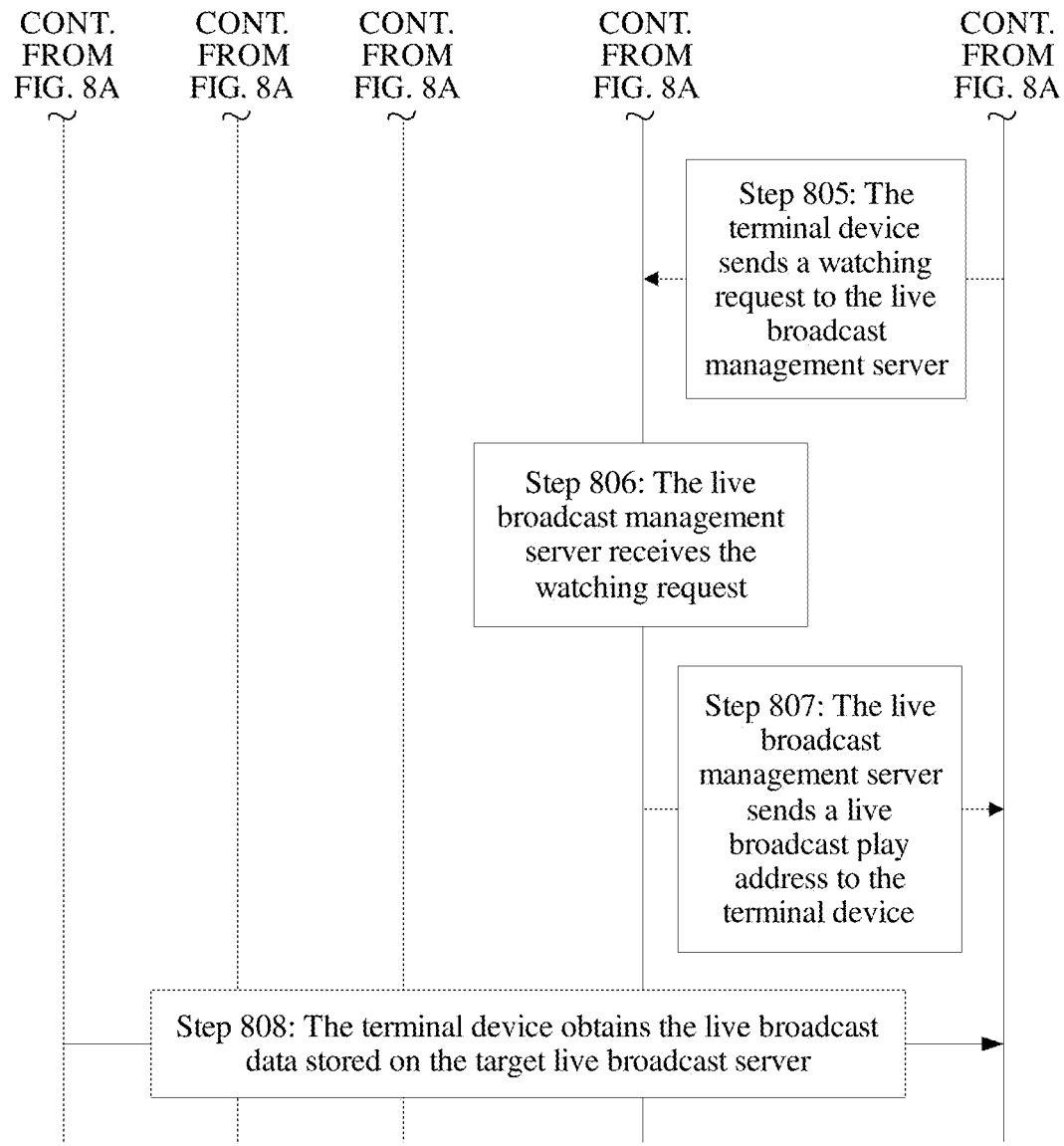
Figure 9A:
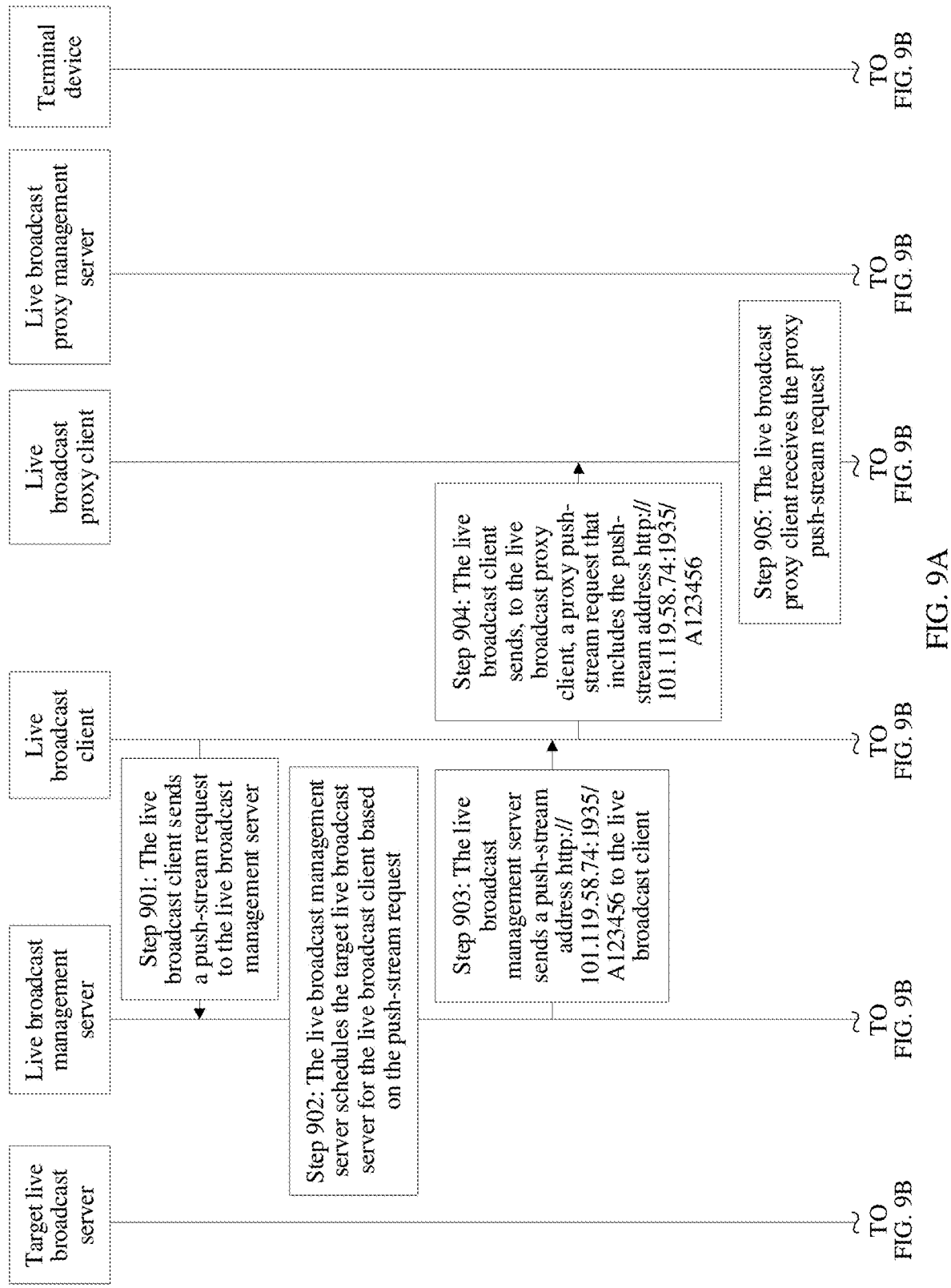
Figure 9B:
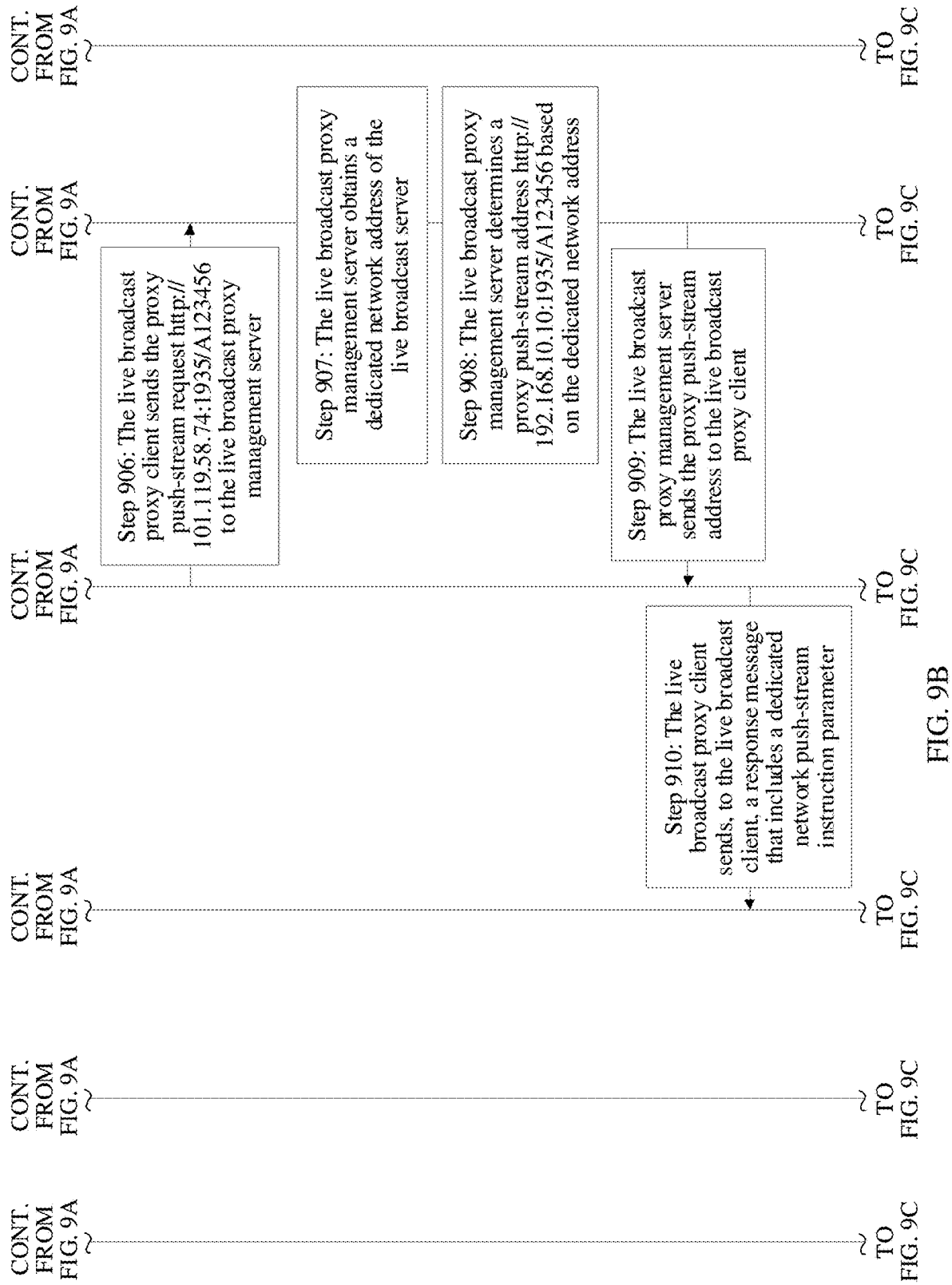
Figure 9D:
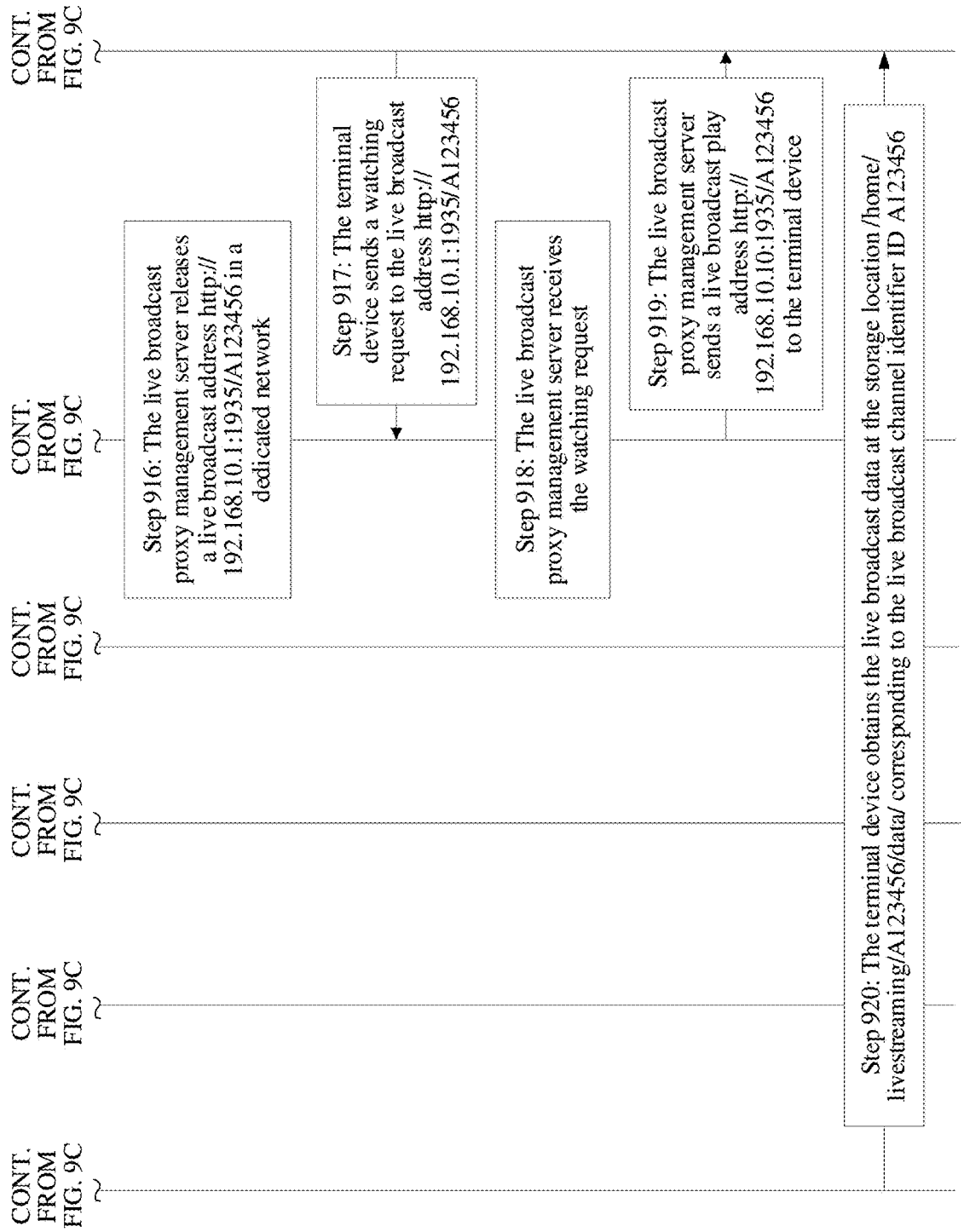

Based on the live broadcast method shown in FIG. 6A and FIG. 6B, the following describes a specific process in which the live broadcast client pushes the live broadcast data to the live broadcast server over an uplink of the Internet, with reference to FIG. 8A and FIG. 8B.

Step 801: The live broadcast client pushes the live broadcast data to the target live broadcast server.

Specifically, the live broadcast client pushes, over the uplink of the Internet, the live broadcast data to the target live broadcast server based on the response message that includes the Internet push-stream instruction parameter.

In this embodiment, when the live broadcast client has received the response message that includes the Internet push-stream instruction parameter, the live broadcast client may send the collected live broadcast data to the target live broadcast server.

For a specific process in which the live broadcast client receives the response message that includes the Internet push-stream instruction parameter, refer to FIG. 6A and FIG. 6B. Details are not described in this embodiment.

It can be learned from the foregoing description that the push-stream address received by the live broadcast client includes the IP address of the target live broadcast server and the live broadcast channel ID, and the live broadcast client in this embodiment may send the live broadcast data to the target live broadcast server based on the push-stream address.

Step 802: The target live broadcast server receives the live broadcast data sent by the live broadcast client.

Specifically, the target live broadcast server in this embodiment receives the live broadcast data over the uplink of the Internet, and stores the live broadcast data at a storage location corresponding to the live broadcast channel ID.

Through execution of step 801 and step 802 in this embodiment, the live broadcast client can release the live broadcast data by using the Internet, that is, the stream pushing process shown in FIG. 4 is implemented.

This embodiment describes, by using the following steps, how to implement a stream pulling process of the live broadcast data shown in FIG. 4 on the target live broadcast server that accesses only the Internet, so as to play the live broadcast data.

Step 803: The live broadcast management server determines whether the live broadcast data has been stored on the target live broadcast server; and if yes, performs step 804.

The live broadcast management server in this embodiment may query, by using the Internet link, whether the live broadcast data has been stored on the target live broadcast server. If the live broadcast management server determines that the live broadcast data has been stored on the target live broadcast server, the live broadcast management server continues to perform step 804.

Step 804: The live broadcast management server releases a live broadcast address on the Internet.

When the live broadcast data has been stored on the target live broadcast server, the live broadcast management server may release the live broadcast address.

The live broadcast address includes an address of the live broadcast management server and the live broadcast channel ID.

Specifically, the address of the live broadcast management server is an address of the live broadcast management server in the Internet.

Optionally, the live broadcast management server in this embodiment may release the live broadcast address by using an EPG.

Step 805: A terminal device sends a watching request to the live broadcast management server.

Specifically, the terminal device in this embodiment is the first terminal device 306 shown in FIG. 3. The first terminal device 306 may send, to the live broadcast management server over the uplink of the Internet, the watching request used for requesting the live broadcast data.

Specifically, the watching request includes the live broadcast channel ID.

Step 806: The live broadcast management server receives the watching request.

Step 807: The live broadcast management server sends a live broadcast play address to the terminal device.

The live broadcast management server in this embodiment pre-stores a correspondence between the live broadcast channel ID and an IP address, and the IP address is an address of the target live broadcast server in the Internet.

In this embodiment, when the live broadcast management server obtains the live broadcast channel ID included in the watching request, the live broadcast management server may determine the IP address corresponding to the live broadcast channel ID.

The live broadcast management server generates the live broadcast play address. The live broadcast play address includes the live broadcast channel ID and the IP address.

Step 808: The terminal device obtains the live broadcast data stored on the target live broadcast server.

Specifically, the terminal device in this embodiment can be interconnected to the target live broadcast server based on the live broadcast play address, so that the terminal device can obtain, based on the live broadcast play address, the live broadcast data stored at the storage location corresponding to the live broadcast channel ID. In this way, the live broadcast data can be played on the terminal device.

It can be learned that in the live broadcast method shown in FIG. 8A and FIG. 8B, the live broadcast client can push, over the uplink of the Internet, the live broadcast data to the target live broadcast server that accesses only the Internet, so that even if the target live broadcast server does not access a dedicated network, a push-stream of the live broadcast data can still be implemented, and a terminal device that accesses only the Internet can also watch the live broadcast data.

To better understand the live broadcast methods shown in FIG. 6A to FIG. 8B in the embodiments, the following provides example descriptions of a live broadcast method provided in an embodiment of the present disclosure, with reference to FIG. 9A to FIG. 9D. FIG. 9A to FIG. 9D are a flowchart of step execution of an application scenario of an embodiment of the live broadcast method according to the present disclosure.

For details about a structure of a live broadcast system on which the application scenario shown in FIG. 9A to FIG. 9D is based, refer to FIG. 3. Details are not described in this embodiment.

The live broadcast method in the application scenario specifically includes the following steps.

Step 901: A live broadcast client sends a push-stream request to a live broadcast management server.

Step 902: The live broadcast management server schedules a target live broadcast server for the live broadcast client based on the push-stream request.

In this application scenario, the target live broadcast server scheduled by the live broadcast management server 303 may be a live broadcast server that accesses both the Internet and a dedicated network. In this application scenario, for example, an IP address of the target live broadcast server is 101.119.58.74, and a dedicated network address of the target live broadcast server is 192.168.10.10. The live broadcast management server 303 in this application scenario may learn that a live broadcast channel ID created on the target live broadcast server is A123456, and a storage location corresponding to the live broadcast channel ID A123456 is /home/livestreaming/A123456/data/.

Step 903: The live broadcast management server sends a push-stream address http://101.119.58.74:1935/A123456 to the live broadcast client.

1935 represents a transmission port number during stream pushing.

Step 904: The live broadcast client sends, to a live broadcast proxy client, a proxy push-stream request that includes the push-stream address http://101.119.58.74:1935/A123456.

Step 905: The live broadcast proxy client receives the proxy push-stream request.

The live broadcast proxy client and the live broadcast client in this application scenario may exchange data with each other, so that the live broadcast client can send the proxy push-stream request to the live broadcast proxy client.

The following describes how the live broadcast proxy client and the live broadcast client exchange data with each other.

The live broadcast client and the live broadcast proxy client may exchange the proxy push-stream request by using a proprietary protocol.

Specifically, first a message type and a transmission port number of the proxy push-stream request need to be defined between the live broadcast client and the live broadcast proxy client, and the live broadcast proxy client listens to the message type of the proxy push-stream request on a defined port number.

When the live broadcast client needs to send the proxy push-stream request, the live broadcast client may send the message type of the push-stream request to the live broadcast proxy client based on an address and a port number of the live broadcast proxy client that are configured in advance; or the live broadcast client sends a multicast message to all live broadcast proxy clients in a home network by using an SSDP (Simple Service Discovery Protocol), and a message type is the message type of the proxy push-stream request.

After listening to the message type of the proxy push-stream request, the live broadcast proxy client sends a response to the live broadcast client. After receiving the response, the live broadcast client further sends the proxy push-stream request to the live broadcast proxy client, for example, the foregoing Internet push-stream address: http://101.119.58.74:1935/A123456.

Step 906: The live broadcast proxy client sends the proxy push-stream request http://101.119.58.74:1935/A123456 to a live broadcast proxy management server.

Step 907: The live broadcast proxy management server obtains a dedicated network address of the live broadcast server.

Specifically, if the push-stream address obtained by the live broadcast proxy management server by using the proxy push-stream request is http://101.119.58.74:1935/A123456, the live broadcast proxy management server may determine, by using the address mapping table shown in Table 1, that a dedicated network address corresponding to the IP address 101.119.58.74 is 192.168.10.10.

The following describes a manner in which the live broadcast proxy management server creates the address mapping table in this application scenario.

An optional manner of creating the address mapping table is as follows:

The live broadcast proxy management server may automatically obtain network adapter address information of all live broadcast servers in a server cluster 305 by using ifconfig or ipconfig, where ifconfig is a command used for displaying or configuring a network device (a network interface card) in a Linux operating system, and ipconfig is a command for displaying IP address information and is used for displaying a TCP/IP network configuration value of the live broadcast proxy management server.

The live broadcast proxy management server may create a correspondence between an IP address of each live broadcast server and a dedicated network address based on the obtained network adapter address information of each live broadcast server.

Another optional manner of creating the address mapping table is as follows:

The live broadcast proxy management server may receive through an operation interface a correspondence, entered by a manager, between an IP address of each live broadcast server and a dedicated network address, so that the live broadcast proxy management server creates the address mapping table based on the received correspondence between an IP address of a live broadcast server and a dedicated network address.

It should be noted that the descriptions of the manners of creating the address mapping table by the live broadcast proxy management server in this application scenario are an optional example and impose no limitation, provided that the live broadcast proxy management server can obtain the correspondence between an IP address of a live broadcast server and a dedicated network address.

Step 908: The live broadcast proxy management server determines a proxy push-stream address http://192.168.10.10:1935/A123456 based on the dedicated network address.

A123456 is the live broadcast channel ID.

Step 909: The live broadcast proxy management server sends the proxy push-stream address to the live broadcast proxy client.

Step 910: The live broadcast proxy client sends, to the live broadcast client, a response message that includes a dedicated network push-stream instruction parameter.

Step 911: The live broadcast client receives the response message that includes the dedicated network push-stream instruction parameter.

Step 912: The live broadcast client sends collected live broadcast data to the live broadcast proxy client.

Specifically, in a specific process, the live broadcast client may send the live broadcast data in a private live broadcast data transmission manner, that is, the live broadcast client and the live broadcast proxy client agree on a live broadcast data transmission manner, and the live broadcast client may send the live broadcast data to the live broadcast proxy client in the agreed live broadcast data transmission manner.

In this application scenario, the descriptions of the manner of sending the live broadcast data by the live broadcast client to the live broadcast proxy client are an optional example and impose no limitation. For example, the live broadcast client may alternatively send the live broadcast data to the live broadcast proxy client based on an existing Real-Time Messaging Protocol (RTMP).

Step 913: The live broadcast proxy client pushes the live broadcast data to the target live broadcast server based on the proxy push-stream address http://192.168.10.10:1935/A123456.

When the live broadcast proxy client receives the live broadcast data, the live broadcast proxy client pushes the live broadcast data to the target live broadcast server with the dedicated network address 192.168.10.10 based on the proxy push-stream address http://192.168.10.10:1935/A123456.

Step 914: The target live broadcast server stores the live broadcast data at a storage location /home/livestreaming/A123456/data/ corresponding to the live broadcast channel ID.

Specifically, the target live broadcast server receives the live broadcast data by using 192.168.10.10, and stores the live broadcast data at the storage location /home/livestreaming/A123456/data/ corresponding to the live broadcast channel ID A123456.

In this application scenario, the live broadcast data has been successfully stored on the target live broadcast server, and a stream pulling process of the live broadcast data may further be implemented by using the following steps:

Step 915: The live broadcast proxy management server determines whether the live broadcast data has been stored on the target live broadcast server; and if yes, performs step 916.

For a detailed process in which the live broadcast proxy client determines whether the live broadcast data has been stored on the target live broadcast server, refer to FIG. 7A and FIG. 7B. Details are not described in this embodiment.

Step 916: The live broadcast proxy management server releases a live broadcast address http://192.168.10.1:1935/A123456 in a dedicated network.

192.168.10.1 in http://192.168.10.1:1935/A123456 is an address of the live broadcast proxy management server.

In this application scenario, the live broadcast proxy management server may release the live broadcast address by using an EPG.

Step 917: A terminal device sends a watching request to the live broadcast address http://192.168.10.1:1935/A123456.

Specifically, the terminal device is the second terminal device 307 shown in FIG. 3. That is, the second terminal device 307 is a terminal device that can watch live broadcast data by using the dedicated network.

It can be learned that the watching request in this application scenario includes the live broadcast channel ID A123456.

Step 918: The live broadcast proxy management server receives the watching request.

Step 919: The live broadcast proxy management server sends a live broadcast play address http://192.168.10.10:1935/A123456 to the terminal device.

In this application scenario, a target list may be set on the live broadcast proxy management server. A correspondence between different live broadcast channel IDs and dedicated network addresses is created in the target list.

For the target list in this application scenario, refer to Table 2 in the foregoing embodiment. For detailed descriptions of Table 2, refer to the foregoing embodiment. Details are not described in this application scenario.

In this application scenario, the live broadcast proxy management server may learn, based on Table 2, that the dedicated network address corresponding to the live broadcast channel ID A123456 included in the watching request is 192.168.10.10.

Step 920: The terminal device obtains the live broadcast data at the storage location /home/livestreaming/A123456/data/ corresponding to the live broadcast channel ID A123456.

Specifically, in this application scenario, when the terminal device obtains the live broadcast play address http://192.168.10.10:1935/A123456, the terminal device may determine the storage location /home/livestreaming/ corresponding to the live broadcast channel ID A123456. The terminal device may obtain the live broadcast data at the storage location /home/livestreaming/, so that the terminal device can display the live broadcast data.

The following describes in detail overall beneficial effects of using the methods in the embodiments shown in FIG. 6A to FIG. 9D.

According to the live broadcast methods in the embodiments, when the scheduled live broadcast server accesses only the Internet, a live broadcast can be watched on the Internet, thereby ensuring that a user can successfully watch the live broadcast, and avoiding a case in which the live broadcast cannot be successfully watched because the live broadcast server accesses only the Internet.

When the scheduled live broadcast server accesses both the Internet and the dedicated network, the live broadcast data may be pushed to the live broadcast server that accesses both the Internet and the dedicated network, so that the live broadcast can be watched on the dedicated network. The dedicated network in this embodiment is a bearer network for implementing services such as digital television interaction, and is a manageable and guaranteed local area network. Network isolation and service isolation are implemented for the Internet and the dedicated network by using a virtual private network (VPN) technology, so as to manage, control, and guarantee a dedicated network service. In addition, the dedicated network has a QoS guarantee, and an uplink bandwidth of the dedicated network is relatively large, thereby effectively avoiding a case in which the live broadcast client gets offline. Therefore, a probability of successful live broadcast data transmission is increased, and the live broadcast data has high image quality and a low latency.

In addition, according to the methods in the embodiments, if the live broadcast data is video data, because the dedicated network in the embodiments has a QoS guarantee, and the uplink bandwidth of the dedicated network is relatively large, a very clear video image can be provided in the embodiments, that is, high-definition or even 4K/8K video quality can be provided in the live broadcast methods in the embodiments.

In the live broadcast methods in the embodiments, the live broadcast data can be pushed to both the Internet and the dedicated network. Therefore, a terminal device that needs to play the live broadcast data has more access manners. Because the live broadcast data can be played on the dedicated network in the live broadcast methods in the embodiments, a user accustomed to using the dedicated network can also watch the live broadcast data. This greatly expands a user scope of a live broadcast service.

Figure 10A:
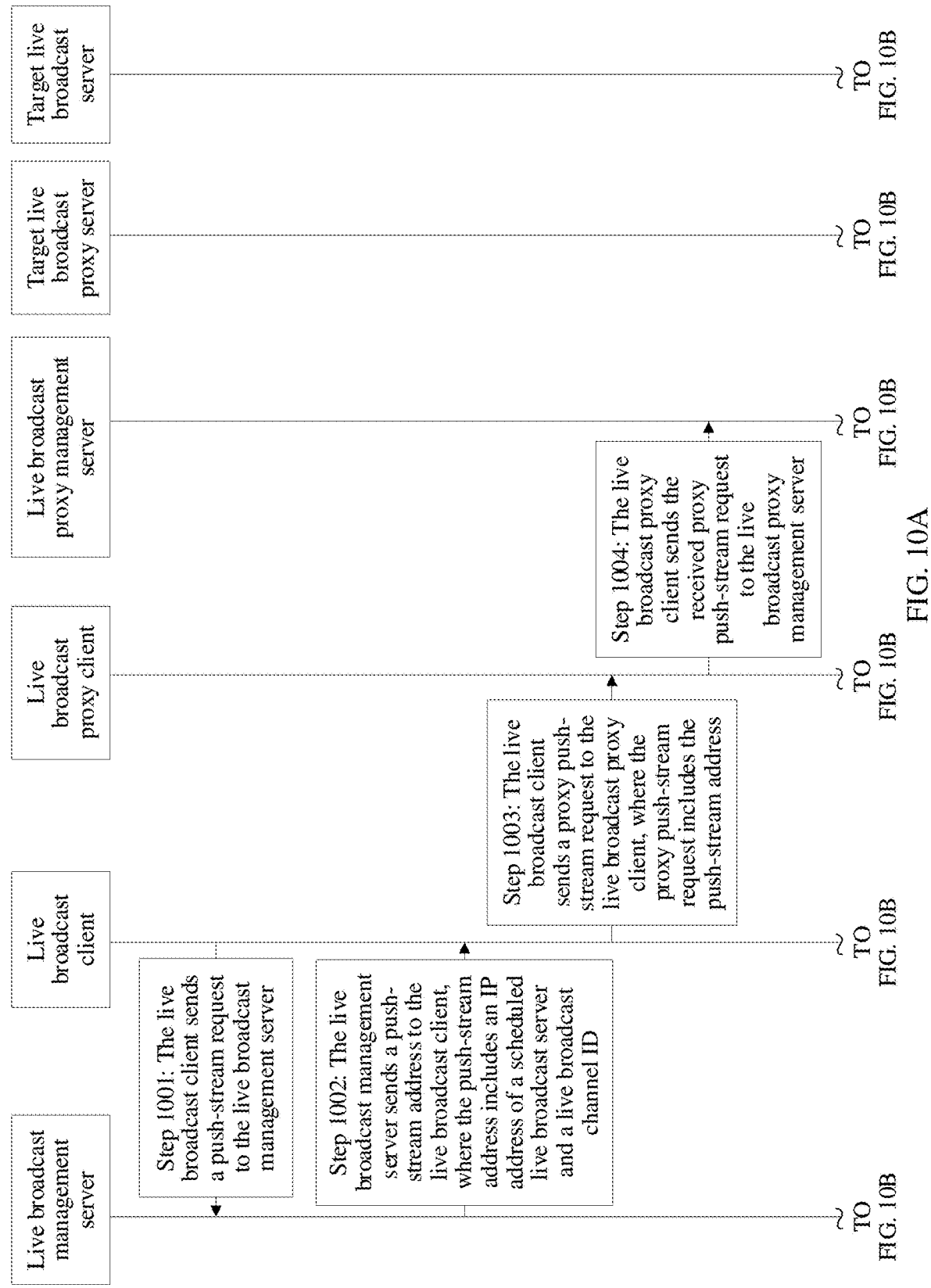
FIG. 10A to FIG. 10C are a flowchart of step execution of another embodiment of a live broadcast method according to the present disclosure.
Figure 10B:
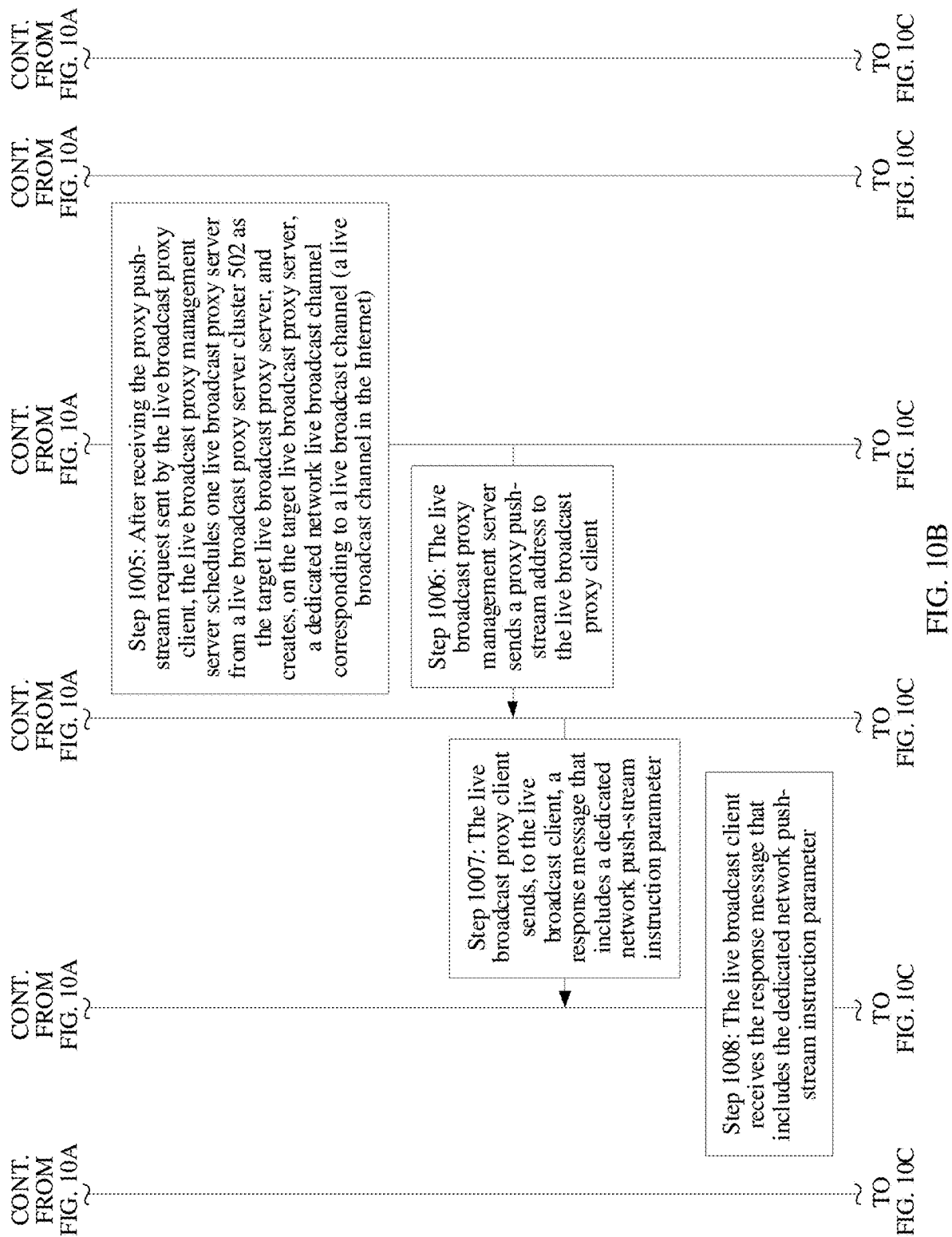
Figure 10C:
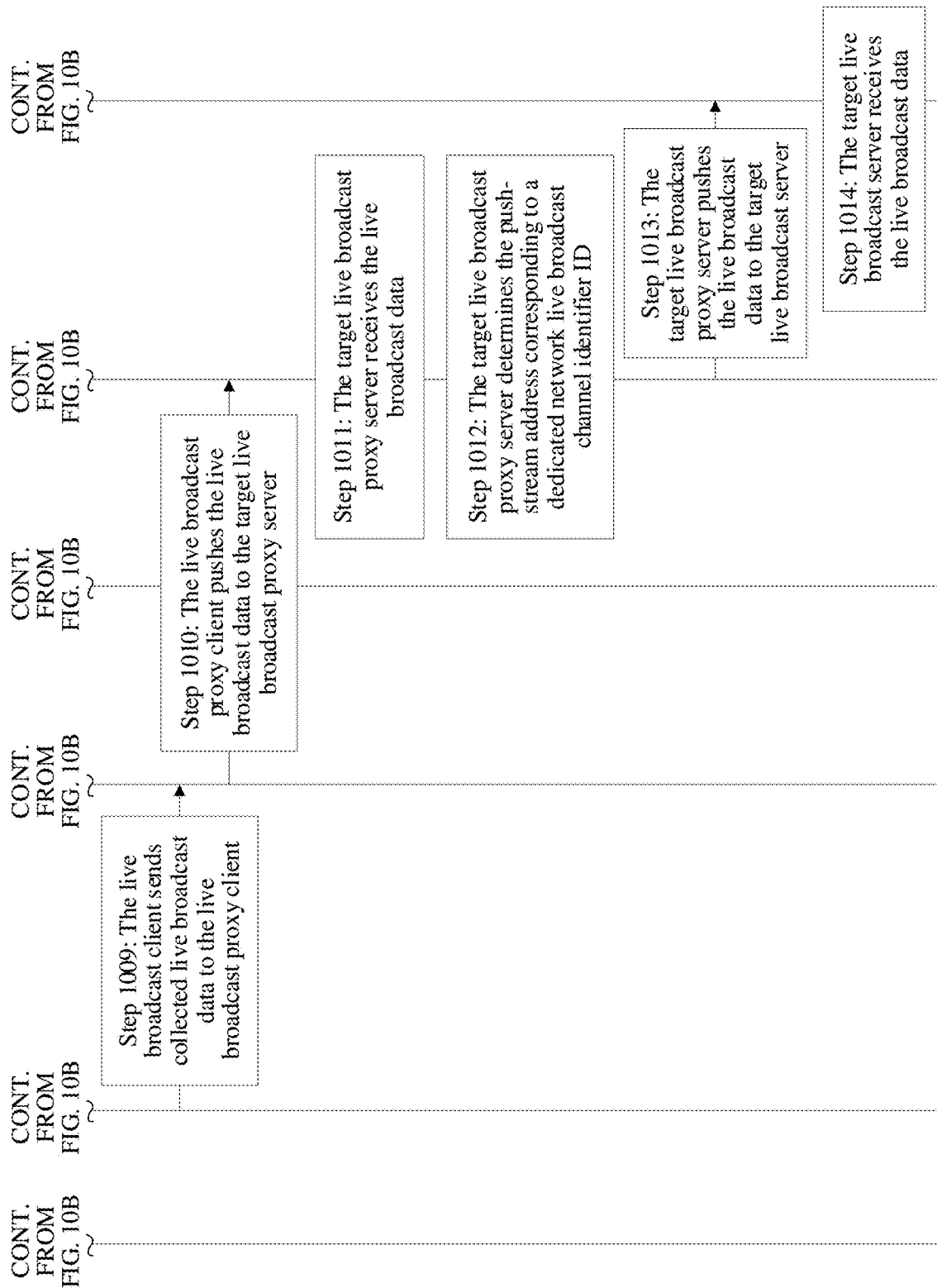

Based on the live broadcast system shown in FIG. 5, specific execution procedures of the live broadcast methods in the embodiments of the present disclosure are described in detail in the following with reference to FIG. 10A to FIG. 10C and FIG. 11. FIG. 10A to FIG. 10C describe in detail a specific process in which a live broadcast client determines to push a stream of live broadcast data by using a dedicated network in the live broadcast method provided in the embodiments of the present disclosure.

Based on the live broadcast system shown in FIG. 5, the live broadcast method shown in FIG. 10A and FIG. 10C specifically includes the following steps.

Step 1001: The live broadcast client sends a push-stream request to the live broadcast management server.

Step 1002: The live broadcast management server sends a push-stream address to the live broadcast client, where the push-stream address includes an IP address of a scheduled live broadcast server and a live broadcast channel ID.

Step 1003: The live broadcast client sends a proxy push-stream request to a live broadcast proxy client, where the proxy push-stream request includes the push-stream address.

Step 1004: The live broadcast proxy client sends the received proxy push-stream request to a live broadcast proxy management server.

For detailed execution processes of step 1001 to step 1004 in this embodiment, refer to step 601 to step 604 shown in FIG. 6A. The specific execution processes are not described in this embodiment.

Step 1005: After receiving the proxy push-stream request sent by the live broadcast proxy client, the live broadcast proxy management server schedules one live broadcast proxy server from a live broadcast proxy server cluster 502 as a target live broadcast proxy server, and creates, on the target live broadcast proxy server, a dedicated network live broadcast channel corresponding to a live broadcast channel (a live broadcast channel on the Internet).

The live broadcast channel is a live broadcast channel created by the live broadcast management server on a target live broadcast server, and the target live broadcast server is a live broadcast server scheduled by the live broadcast management server from a live broadcast server cluster 501. For a detailed process in which the live broadcast management server schedules the live broadcast server, refer to FIG. 6A and FIG. 6B. Details are not described in this embodiment.

The live broadcast proxy management server may schedule the target live broadcast proxy server from the live broadcast proxy server cluster according to a scheduling policy.

This embodiment imposes no limitation on the scheduling policy. For example, the scheduling policy in this embodiment may be that a live broadcast proxy server closest to the live broadcast client is the target live broadcast proxy server. The scheduling policy may alternatively be that a live broadcast proxy server whose load is less than a preset value is the target live broadcast proxy server.

Specifically, when the live broadcast proxy management server schedules the target live broadcast proxy server, the live broadcast proxy management server may obtain a dedicated network address of the target live broadcast proxy server.

More specifically, the live broadcast proxy management server may save dedicated network live broadcast channel information.

The dedicated network live broadcast channel information includes a dedicated network live broadcast channel ID and a storage location corresponding to the dedicated network live broadcast channel ID, and the dedicated network live broadcast channel ID is an ID corresponding to the dedicated network live broadcast channel.

Optionally, the live broadcast proxy management server in this embodiment may generate correspondence indication information, and the correspondence indication information includes a correspondence between the dedicated network live broadcast channel ID and the push-stream address.

The live broadcast proxy management server may send the correspondence indication information to the target live broadcast proxy server, so that the live broadcast proxy server can obtain the correspondence between the dedicated network live broadcast channel ID and the push-stream address based on the correspondence indication information.

Optionally, before scheduling one live broadcast proxy server from the live broadcast proxy server cluster 502 as the target live broadcast proxy server, the live broadcast proxy management server may perform authentication on an identity of the host. For a detailed process of performing authentication on the identity of the host, refer to FIG. 6A and FIG. 6B in the embodiment. Details are not described in this embodiment.

Optionally, before one live broadcast proxy server is scheduled as the target live broadcast proxy server from the live broadcast proxy server cluster 502, a load status of the live broadcast proxy server cluster 502 may further be considered.

For example, a load threshold may be preset on the live broadcast proxy management server in this embodiment, and the live broadcast proxy management server monitors load of any live broadcast proxy server in the live broadcast proxy server cluster 502. The live broadcast proxy management server schedules one live broadcast proxy server for the live broadcast client only when a live broadcast proxy server with load less than the load threshold exists in the live broadcast proxy server cluster.

In this embodiment, if the live broadcast proxy management server cannot schedule one live broadcast proxy server as the target live broadcast proxy server, it is determined that the live broadcast client cannot push a stream of live broadcast data over an uplink of the dedicated network connected to the live broadcast proxy client. In this case, the live broadcast client may push the live broadcast data to the live broadcast server by using the Internet. For a specific process, refer to the embodiments shown in FIG. 6A and FIG. 6B and FIG. 7A and FIG. 7B. Details are not described again.

Step 1006: The live broadcast proxy management server sends a proxy push-stream address to the live broadcast proxy client.

Specifically, the proxy push-stream address includes the dedicated network address of the target live broadcast proxy server and the dedicated network live broadcast channel ID.

Step 1007: The live broadcast proxy client sends, to the live broadcast client, a response message that includes a dedicated network push-stream instruction parameter.

Step 1008: The live broadcast client receives the response message that includes the dedicated network push-stream instruction parameter.

Step 1009: The live broadcast client sends collected live broadcast data to the live broadcast proxy client.

For a detailed execution process of step 1009 in this embodiment, refer to step 701 shown in FIG. 7A. The specific execution process is not described again.

Step 1010: The live broadcast proxy client pushes the live broadcast data to the target live broadcast proxy server.

Specifically, it can be learned from the foregoing descriptions that, the proxy push-stream address includes the dedicated network address of the target live broadcast proxy server and the dedicated network live broadcast channel ID.

More specifically, the live broadcast proxy client in this embodiment may send the live broadcast data to the target live broadcast proxy server.

Step 1011: The target live broadcast proxy server receives the live broadcast data.

Specifically, the target live broadcast proxy server receives the live broadcast data, and the target live broadcast proxy server stores the received live broadcast data at the storage location corresponding to the dedicated network live broadcast channel ID.

Step 1012: The target live broadcast proxy server determines the push-stream address corresponding to the dedicated network live broadcast channel ID.

Specifically, the target live broadcast proxy server in this embodiment may determine, based on the correspondence indication information, the push-stream address corresponding to the dedicated network live broadcast channel ID.

For detailed descriptions of the correspondence indication information, refer to FIG. 10A and FIG. 10C. Details are not described in this step.

Step 1013: The target live broadcast proxy server pushes the live broadcast data to the target live broadcast server.

It should be noted that the target live broadcast proxy server may push the live broadcast data to the target live broadcast server over an uplink of the Internet. In another possible implementation, a VPN may be established between the target live broadcast server and the target live broadcast proxy server. The target live broadcast proxy server may push the live broadcast data to the target live broadcast server over a channel of the VPN.

Step 1014: The target live broadcast server receives the live broadcast data.

Step 1009 to step 1011 in this embodiment show a process in which the live broadcast client releases the live broadcast data by using the dedicated network. It can be learned that, the live broadcast data can be stored on the target live broadcast proxy server in the live broadcast proxy server cluster by performing step 1009 to step 1011, and the live broadcast data can be stored on the target live broadcast server in the live broadcast server cluster by performing step 1012 to step 1014 in this embodiment. Therefore, according to the method in this embodiment, the live broadcast data can be released on both the Internet and the dedicated network, and a user can watch the live broadcast data on both the dedicated network and the Internet.

Figure 11:
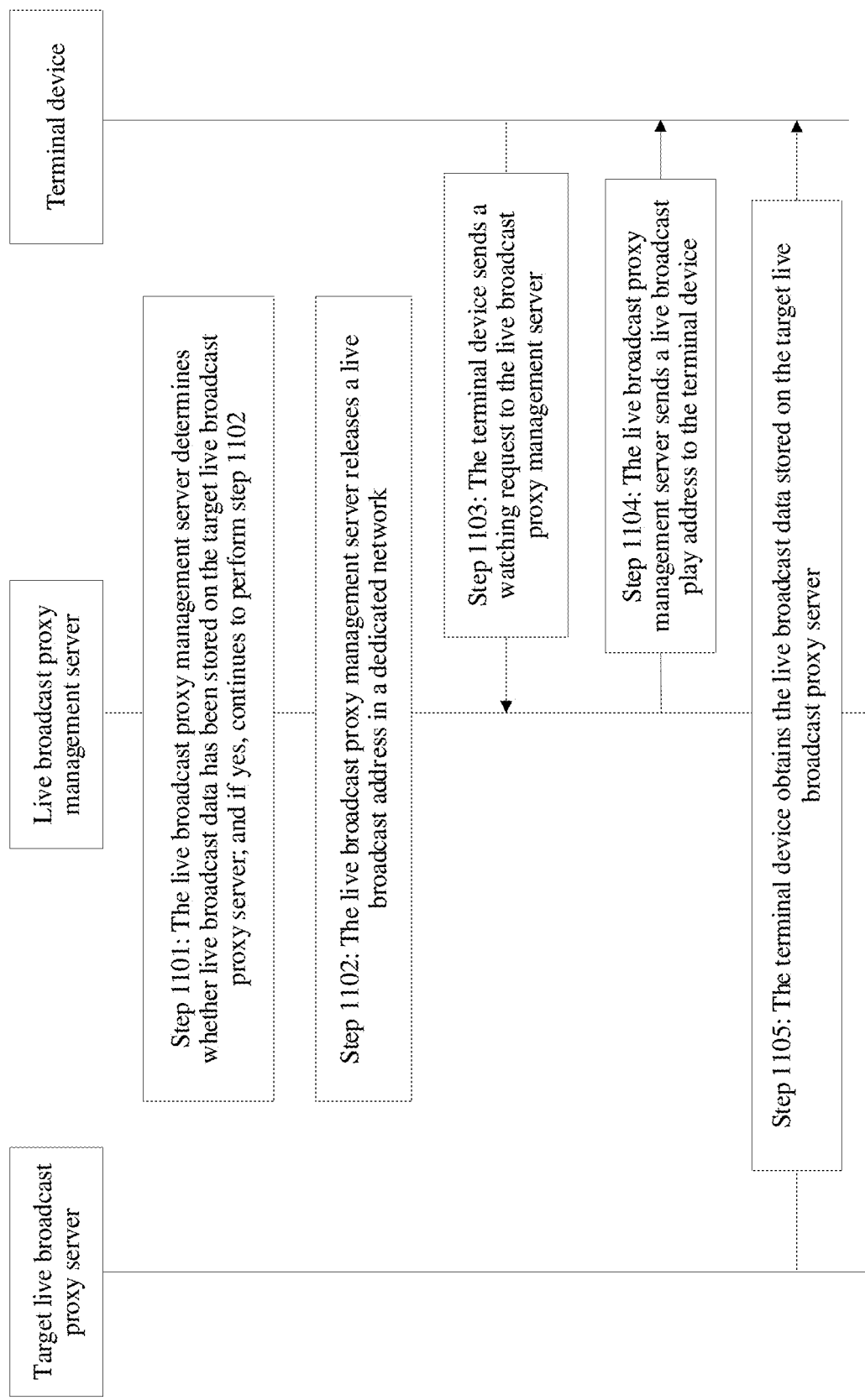
FIG. 11 is a flowchart of step execution of another embodiment of a live broadcast method according to the present disclosure.

With reference to FIG. 11, the following describes how to implement a specific process of watching the live broadcast data on the dedicated network when the live broadcast data is stored on the target live broadcast proxy server and the target live broadcast server. For details, refer to the following steps.

Step 1101: The live broadcast proxy management server determines whether the live broadcast data has been stored on the target live broadcast proxy server; and if yes, continues to perform step 1102.

Specifically, the live broadcast proxy management server may query, by using the dedicated network link, whether the live broadcast data has been stored on the target live broadcast proxy server. If the live broadcast proxy management server determines that the live broadcast data has been stored on the target live broadcast proxy server, the live broadcast proxy management server continues to perform step 1102.

Step 1102: The live broadcast proxy management server releases a live broadcast address in the dedicated network.

When the live broadcast data has been stored on the target live broadcast proxy server, the live broadcast proxy management server may release the live broadcast address.

The live broadcast address includes an address of the live broadcast proxy management server and the dedicated network live broadcast channel ID.

Specifically, the address of the live broadcast proxy management server is an address of the live broadcast proxy management server in the dedicated network.

The dedicated network live broadcast channel ID is an ID of a dedicated network live broadcast channel created by the live broadcast proxy management server on the target live broadcast proxy server.

Optionally, the live broadcast proxy management server in this embodiment may release the live broadcast address by EPG.

Step 1103: A terminal device sends a watching request to the live broadcast proxy management server.

Specifically, the terminal device in this embodiment is the second terminal device 307 shown in FIG. 5. The terminal device in this embodiment may send the watching request to the live broadcast proxy management server over the uplink of the dedicated network.

Specifically, the watching request includes the dedicated network live broadcast channel ID.

It can be learned from the foregoing steps that the live broadcast proxy management server has recorded the correspondence between the dedicated network live broadcast channel ID and the dedicated network address of the target live broadcast proxy server. In this step, the live broadcast proxy management server may determine, based on the dedicated network live broadcast channel ID included in the watching request, the dedicated network address of the target live broadcast proxy server that is corresponding to the dedicated network live broadcast channel ID. It can be learned from the foregoing description that the live broadcast data in this embodiment is stored at the storage location corresponding to the dedicated network live broadcast channel ID.

Step 1104: The live broadcast proxy management server sends a live broadcast play address to the terminal device.

Specifically, the live broadcast proxy management server may send the live broadcast play address to the terminal device over the uplink of the dedicated network.

Specifically, the live broadcast play address includes the dedicated network live broadcast channel ID and the dedicated network address.

Step 1105: The terminal device obtains the live broadcast data stored on the target live broadcast proxy server.

Specifically, the terminal device in this embodiment can be interconnected to the dedicated network address of the target live broadcast proxy server based on the live broadcast play address, so that the terminal device can obtain the live broadcast data that is stored on the target live broadcast proxy server and that is at the storage location corresponding to the dedicated network live broadcast channel ID.

For a detailed process of watching the live broadcast data on the Internet in this embodiment, refer to other approaches. The specific process is not described in this embodiment.

Figure 12A:
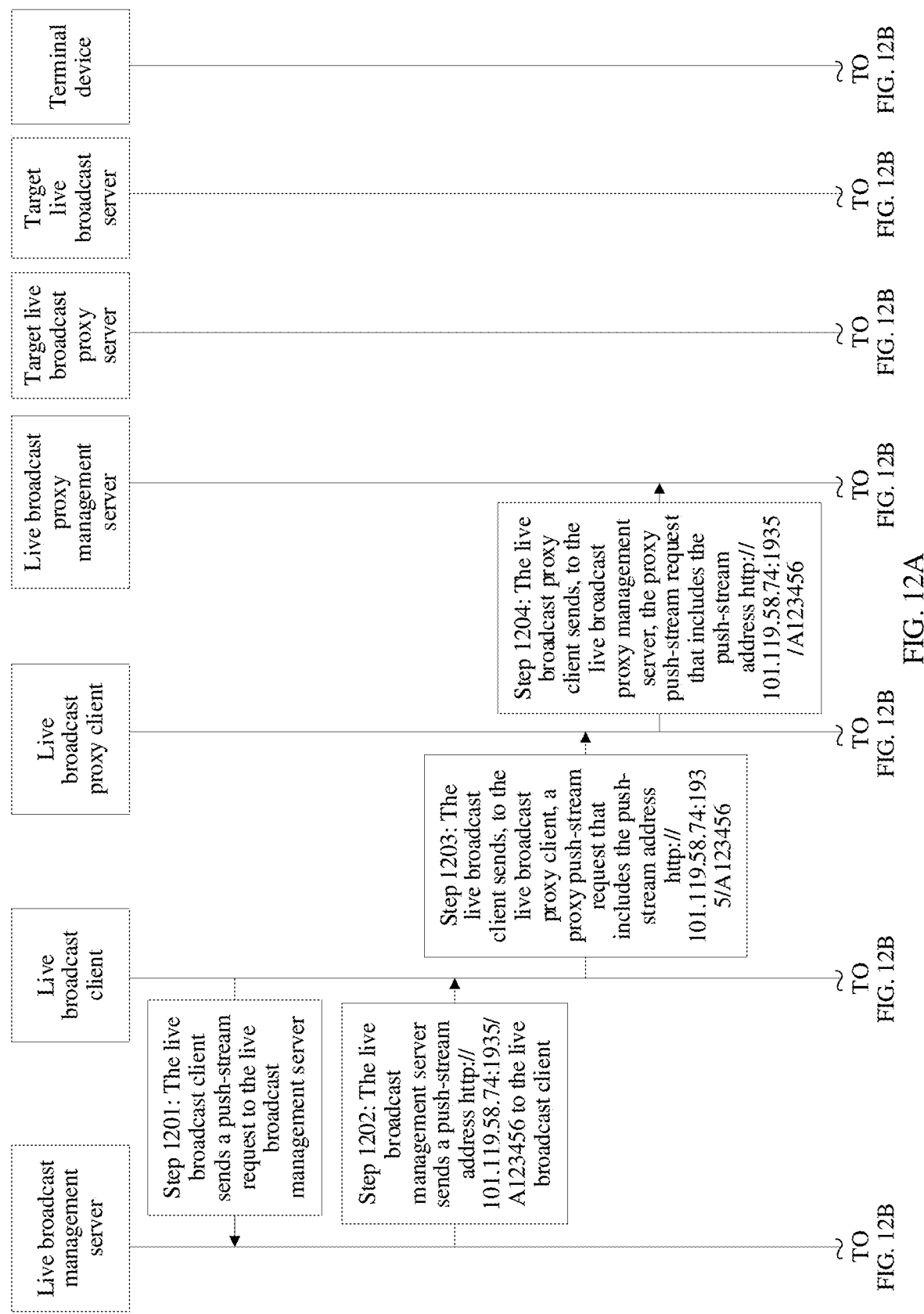

FIG. 10A to FIG. 10C and FIG. 11 in the embodiments describe a specific execution process in which the live broadcast client pushes the live broadcast data to the target live broadcast proxy server and pulls a stream of and plays the live broadcast data on the target live broadcast proxy server. To better understand FIG. 10A to FIG. 10C and FIG. 11, the following provides example descriptions of the live broadcast methods shown in FIG. 10A to FIG. 10C and FIG. 11, with reference to an application scenario shown in FIG. 12A to FIG. 12C. FIG. 12A to FIG. 12C describes a specific execution process of the live broadcast method in detail.

Step 1201: The live broadcast client sends a push-stream request to a live broadcast management server.

Step 1202: The live broadcast management server sends a push-stream address http://101.119.58.74:1935/A123456 to the live broadcast client.

An IP address of the target live broadcast server scheduled by the live broadcast management server is 101.119.58.74.

The live broadcast management server 303 may learn that a live broadcast channel ID of a live broadcast channel created on the target live broadcast server is A123456, and a storage location corresponding to the live broadcast channel ID A123456 is /home/livestreaming/A123456/data/.

The live broadcast management server sends the push-stream address http://101.119.58.74:1935/A123456 to the live broadcast client.

Specifically, 1935 represents a transmission port number during stream pushing.

Step 1203: The live broadcast client sends, to a live broadcast proxy client, a proxy push-stream request that includes the push-stream address http://101.119.58.74:1935/A123456.

It can be learned that the live broadcast proxy client and the live broadcast client in the application scenario may exchange data. For detailed descriptions about how the live broadcast proxy client and the live broadcast client exchange data, refer to the embodiment shown in FIG. 9A to FIG. 9D. Details are not described in this embodiment.

Step 1204: The live broadcast proxy client sends, to a live broadcast proxy management server, the proxy push-stream request that includes the push-stream address http://101.119.58.74:1935/A123456.

Step 1205: The live broadcast proxy management server sends the proxy push-stream address http://192.168.10.5:1935/IPTV654321 to the live broadcast proxy client.

Specifically, the live broadcast proxy management server schedules a target live broadcast proxy server from a live broadcast proxy server cluster.

In this application scenario, the dedicated network live broadcast channel information includes that a dedicated network live broadcast channel ID is IPTV654321 and a storage location is /home/livestreaming/IPTV654321/data/.

For detailed descriptions of the dedicated network live broadcast channel information, refer to FIG. 10A to FIG. 10C. Details are not described in this embodiment.

The dedicated network live broadcast channel ID is an ID of the dedicated network live broadcast channel created on the target live broadcast proxy server.

The dedicated network live broadcast channel further includes the storage location /home/livestreaming/IPTV654321/data/. The storage location /home/livestreaming/IPTV654321/data/ is a storage location that is on the target live broadcast proxy server and that is corresponding to the dedicated network live broadcast channel ID.

Specifically, the live broadcast proxy management server records the dedicated network live broadcast channel ID associated with the live broadcast channel ID A123456, as IPTV654321.

More specifically, one piece of information is added to the dedicated network live broadcast channel information; to be specific, the one piece of information is a correspondence between the dedicated network live broadcast channel and the push-stream address http://101.119.58.74:1935/A123456.

Step 1206: The live broadcast proxy client pushes the live broadcast data to the target live broadcast proxy server.

Specifically, the live broadcast proxy client pushes the live broadcast data to the target live broadcast proxy server with the proxy push-stream address http://192.168.10.5:1935/IPTV654321.

The live broadcast proxy client in this embodiment can push the live broadcast data to a storage location that is on the target live broadcast proxy server with a dedicated network address 192.168.10.5 and that is corresponding to IPTV654321.

Step 1207: The target live broadcast proxy server stores the live broadcast data at the storage location /home/livestreaming/IPTV654321/data/ corresponding to the dedicated network live broadcast channel ID IPTV654321.

Specifically, the live broadcast proxy server receives the live broadcast data by using 192.168.10.5, and stores the live broadcast data at the storage location /home/livestreaming/IPTV654321/data/ corresponding to the dedicated network live broadcast channel ID IPTV654321.

Step 1208: The target live broadcast proxy server determines the push-stream address http://101.119.58.74:1935/A123456 corresponding to the dedicated network live broadcast channel ID.

It can be learned from the foregoing that the target live broadcast proxy server in this embodiment has recorded that the push-stream address corresponding to the dedicated network live broadcast channel ID is http://101.119.58.74:1935/A123456.

Step 1209: The target live broadcast proxy server pushes the live broadcast data to the target live broadcast server.

Specifically, the target live broadcast proxy server in this embodiment pushes the live broadcast data to the target live broadcast server with the push-stream address http://101.119.58.74:1935/A123456 over an uplink of the Internet.

In this application scenario, the target live broadcast server can also receive the live broadcast data, and the target live broadcast server can store the live broadcast data at the storage location corresponding to the live broadcast channel ID A123456.

Because the live broadcast data is successfully stored on the target live broadcast proxy server in this application scenario, this application scenario further includes the following steps to implement a stream pulling process of the live broadcast data.

Step 1210: The live broadcast proxy management server releases a live broadcast address http://192.168.10.1:1935/IPTV654321 in a dedicated network.

192.168.10.1 in http://192.168.10.1:1935/IPTV654321 is an address of the live broadcast proxy management server.

In this application scenario, the live broadcast proxy management server may release the live broadcast address by using an EPG.

Step 1211: A terminal device sends a watching request to the live broadcast address http://192.168.10.1:1935/IPTV654321.

Specifically, the terminal device is the second terminal device 307 shown in FIG. 5.

Step 1212: The live broadcast proxy management server receives the watching request.

Step 1213: The live broadcast proxy management server sends a live broadcast play address http://192.168.10.5:1935/IPTV654321 to the terminal device.

In this application scenario, a target list may be set on the live broadcast proxy management server. The target list is shown in Table 3. It can be learned that a correspondence between different live broadcast channel IDs and dedicated network addresses is created on the target list.

TABLE 3

Correspondence between a live broadcast channel ID and a dedicated network address

| Live broadcast channel ID | Dedicated network address |
|---|---|
| IPTV654321 | 192.168.10.5 |

In this application scenario, the live broadcast proxy management server may learn, based on Table 3, that the dedicated network address corresponding to the dedicated network live broadcast channel ID IPTV654321 included in the watching request is 192.168.10.5.

Step 1214: The terminal device obtains the live broadcast play address http://192.168.10.5:1935/IPTV654321.

Step 1215: The terminal device obtains the live broadcast data at the storage location /home/livestreaming/IPTV654321/data/.

Specifically, in this application scenario, when the terminal device obtains the live broadcast play address http://192.168.10.5:1935/IPTV654321, the terminal device may determine the storage location corresponding to the dedicated network live broadcast channel ID IPTV654321. The terminal device may obtain the live broadcast data at the storage location, so that the terminal device can display the live broadcast data.

The following describes in detail beneficial effects of using the method in this embodiment.

According to the live broadcast method in this embodiment, the live broadcast data can be pushed to the target live broadcast server in the Internet and the target live broadcast proxy server in the dedicated network, thereby expanding a user scope of a live broadcast service.

In addition, if a live broadcast is watched in the dedicated network, the dedicated network in this embodiment is a bearer network that implements services such as digital television interaction, and is a manageable and guaranteed local area network. Network isolation and service isolation are implemented for the Internet and the dedicated network by using a VPN technology, so as to manage, control, and guarantee a dedicated network service. In addition, the dedicated network has a QoS guarantee, and an uplink bandwidth of the dedicated network is relatively large, thereby effectively avoiding a case in which the live broadcast client gets offline. Therefore, a probability of successful live broadcast data transmission is increased, and the live broadcast data has high image quality and a low latency.

In addition, according to the method in this embodiment, if the live broadcast data is video data, because the dedicated network in this embodiment has a QoS guarantee, and the uplink bandwidth of the dedicated network is relatively large, a very clear video image can be provided in this embodiment, that is, high-definition or even 4K/8K video quality can be provided in the live broadcast methods in this embodiment.

In the live broadcast method in this embodiment, the live broadcast data can be pushed to both the Internet and the dedicated network. Therefore, a terminal device that needs to play the live broadcast data has more access manners. Because the live broadcast data can be played on the dedicated network in the live broadcast method in this embodiment, a user accustomed to using the dedicated network can also watch the live broadcast data. This greatly expands a user scope of a live broadcast service.

Figure 13:
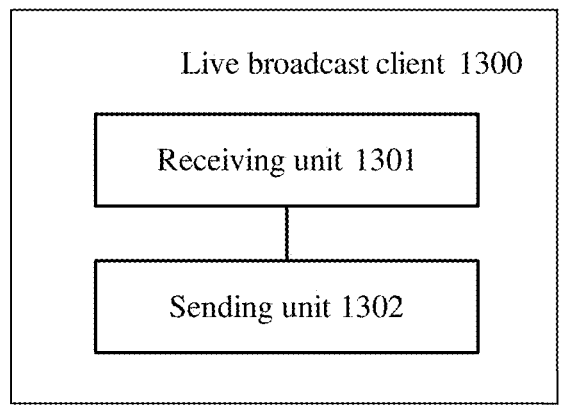
FIG. 13 is a schematic structural diagram of an embodiment of a live broadcast client according to the present disclosure.

Based on FIG. 13, this embodiment describes a specific structure of a live broadcast client in a live broadcast system. For detailed descriptions of the live broadcast system, refer to FIG. 3 or FIG. 5. Details are not described in this embodiment.

FIG. 13 is a schematic structural diagram of an embodiment of a live broadcast client according to the present disclosure.

As shown in FIG. 13, the live broadcast client 1300 includes: a receiving unit 1301 configured to receive a push-stream address sent by a live broadcast management server, where the push-stream address includes an IP address of the live broadcast server; and a sending unit 1302 configured to send a proxy push-stream request to the live broadcast proxy client, where the proxy push-stream request includes the push-stream address, and the proxy push-stream request is used to determine the live broadcast server for receiving live broadcast data.

The sending unit 1302 is further configured to: send collected live broadcast data to the live broadcast proxy client, and push the live broadcast data to the live broadcast server over an uplink of the dedicated network connected to the live broadcast proxy client.

In an optional example, before the sending unit 1302 sends the collected live broadcast data to the live broadcast proxy client, the receiving unit 1301 is further configured to receive a response message that is sent by the live broadcast proxy client and that includes a dedicated network push-stream instruction parameter, where the dedicated network push-stream instruction parameter is used to instruct the live broadcast client to push the live broadcast data to the live broadcast server over the uplink of the dedicated network connected to the live broadcast proxy client.

The live broadcast system in which the live broadcast client in this embodiment is located may be shown in FIG. 3 or FIG. 5. For detailed descriptions of the live broadcast system, refer to the embodiment corresponding to FIG. 3 or FIG. 5. Details are not described in this embodiment.

When the live broadcast client is located in the live broadcast system shown in FIG. 3, and a device in the dedicated network includes a live broadcast proxy management server, the live broadcast client performs a specific process of the live broadcast method. For details, refer to functions of the live broadcast client shown in FIG. 6A to FIG. 9D. A specific execution process is not described in this embodiment.

In another optional example, the live broadcast system in which the live broadcast client in this embodiment is located may be shown in FIG. 5. Devices in the dedicated network include a live broadcast proxy management server and a live broadcast proxy server. For a specific process in which the live broadcast client performs the live broadcast method, refer to functions of the live broadcast client shown in FIG. 10A to FIG. 12C. A specific execution process is not described in this embodiment.

For detailed descriptions of beneficial effects obtained when the live broadcast client in this embodiment performs the live broadcast method, refer to the foregoing embodiment. Details are not described in this embodiment.

Figure 14:
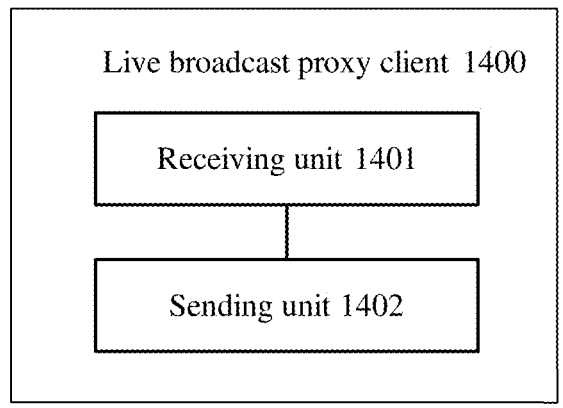
FIG. 14 is a schematic structural diagram of an embodiment of a live broadcast proxy client according to the present disclosure.

Based on FIG. 14, this embodiment describes a specific structure of a live broadcast proxy client in a live broadcast system. The live broadcast proxy client in this embodiment is in the live broadcast system. For detailed descriptions of the live broadcast system, refer to FIG. 3 or FIG. 5. Details are not described in this embodiment.

FIG. 14 is a schematic structural diagram of an embodiment of a live broadcast proxy client according to the present disclosure.

As shown in FIG. 14, the live broadcast proxy client 1400 includes: a receiving unit 1401 configured to receive a proxy push-stream request sent by the live broadcast client, where the proxy push-stream request includes an IP address of the live broadcast server; and a sending unit 1402 configured to send the proxy push-stream request to the live broadcast proxy management server.

The receiving unit 1401 is further configured to receive a proxy push-stream address returned by the live broadcast proxy management server.

The sending unit 1402 is further configured to receive live broadcast data sent by the live broadcast client, and push the live broadcast data to the live broadcast server over an uplink of the dedicated network based on the proxy push-stream address.

In an optional example, after the receiving unit 1401 receives the proxy push-stream address returned by the live broadcast proxy management server, the sending unit 1402 is further configured to send a response message that includes a dedicated network push-stream instruction parameter, to the live broadcast client. The dedicated network push-stream instruction parameter is used to instruct the live broadcast client to push the live broadcast data to the live broadcast server over the uplink of the dedicated network connected to the live broadcast proxy client.

In an optional example, the live broadcast system in which the live broadcast proxy client in this embodiment is located may be shown in FIG. 3. For detailed descriptions of the live broadcast system, refer to the embodiment corresponding to FIG. 3. Details are not described in this embodiment.

When the live broadcast proxy client is located in the live broadcast system shown in FIG. 3, each device in the dedicated network executes a specific function of the live broadcast method. For details, refer to FIG. 6A to FIG. 9D. A specific execution process is not described in this embodiment.

The proxy push-stream address received by the receiving unit 1401 that is included in the live broadcast proxy client located in the live broadcast system shown in FIG. 3 includes a dedicated network address of the live broadcast server.

Specifically, for a detailed process in which the live broadcast proxy client in the live broadcast system shown in FIG. 3 performs the live broadcast method, refer to a function of the live broadcast proxy client shown in FIG. 6A to FIG. 9D. A specific execution process is not described in this embodiment.

In another optional example, the live broadcast system in which the live broadcast proxy client in this embodiment is located may be shown in FIG. 5. For detailed descriptions of the live broadcast system, refer to the embodiment corresponding to FIG. 5. Details are not described in this embodiment.

When the live broadcast proxy client is located in the live broadcast system shown in FIG. 5, a device in the dedicated network further includes a live broadcast proxy server, and each device in the dedicated network executes a specific function of the live broadcast method. For details, refer to FIG. 10A to FIG. 12C. A specific execution process is not described in this embodiment.

That the sending unit 1402 included in the live broadcast proxy client that is located in the live broadcast system shown in FIG. 5 is configured to push the live broadcast data to the live broadcast server over the uplink of the dedicated network based on the proxy push-stream address is specifically: sending the live broadcast data to the live broadcast proxy server based on the proxy push-stream address, so that the live broadcast proxy server stores the live broadcast data, and forwards and pushes the live broadcast data to the live broadcast server.

For a detailed process in which the live broadcast proxy client in the live broadcast system shown in FIG. 5 performs the live broadcast method, refer to functions of the live broadcast proxy client shown in FIG. 10A to FIG. 12C. A specific execution process is not described in this embodiment.

For detailed descriptions of beneficial effects obtained when the live broadcast proxy client in this embodiment performs the live broadcast method, refer to the foregoing embodiment. Details are not described in this embodiment.

Figure 15:
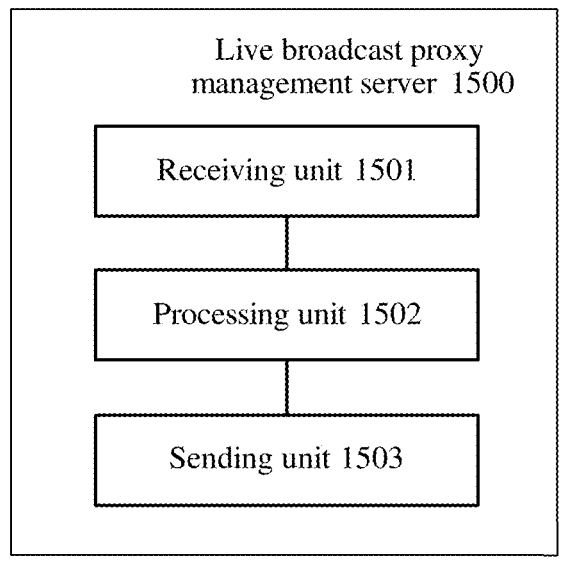
FIG. 15 is a schematic structural diagram of an embodiment of a live broadcast proxy management server according to the present disclosure.

Based on FIG. 15, this embodiment describes a specific structure of a live broadcast proxy management server in a live broadcast system. The live broadcast proxy management server is located in the live broadcast system. For detailed descriptions of the live broadcast system, refer to FIG. 5. Details are not described in this embodiment.

FIG. 15 is a schematic structural diagram of an embodiment of a live broadcast proxy management server according to the present disclosure.

As shown in FIG. 15, the live broadcast proxy management server 1500 includes: a receiving unit 1501 configured to receive a proxy push-stream request sent by the live broadcast proxy client, where the proxy push-stream request includes an IP address of a live broadcast server and a live broadcast channel ID; a processing unit 1502 configured to determine that the live broadcast proxy server exists in the dedicated network, where the live broadcast proxy server has both an IP address and a dedicated network address, where the processing unit 1502 is further configured to: create, on the live broadcast proxy server, a dedicated network live broadcast channel ID corresponding to the live broadcast channel ID, and save a correspondence between the dedicated network live broadcast channel ID and the push-stream address; and a sending unit 1503 configured to return a proxy push-stream address to the live broadcast proxy client, where the proxy push-stream address includes the dedicated network address of the live broadcast proxy server and the dedicated network live broadcast channel ID, so that the live broadcast proxy client pushes live broadcast data to the live broadcast server over an uplink of the dedicated network.

When the live broadcast proxy management server is located in the live broadcast system shown in FIG. 5, each device in the dedicated network executes a specific function of the live broadcast method. For details, refer to FIG. 10A to FIG. 12C. A specific execution process is not described in this embodiment.

For a detailed process in which the live broadcast proxy management server that is located in the live broadcast system shown in FIG. 5 performs the live broadcast method, refer to functions of the live broadcast proxy management servers shown in FIG. 10A to FIG. 12C. A specific execution process is not described in this embodiment.

For detailed descriptions of beneficial effects obtained when the live broadcast proxy management server in this embodiment performs the live broadcast method, refer to the foregoing embodiment. Details are not described in this embodiment.

The foregoing describes related functions when the live broadcast client, the live broadcast proxy client, and the live broadcast proxy management server that are located in the live broadcast system perform the live broadcast method. The related functions of the foregoing devices performing the live broadcast method may be implemented in a hardware form such as an integrated circuit/IC, or may be implemented by computer software executing a corresponding computer program.

Figure 16:
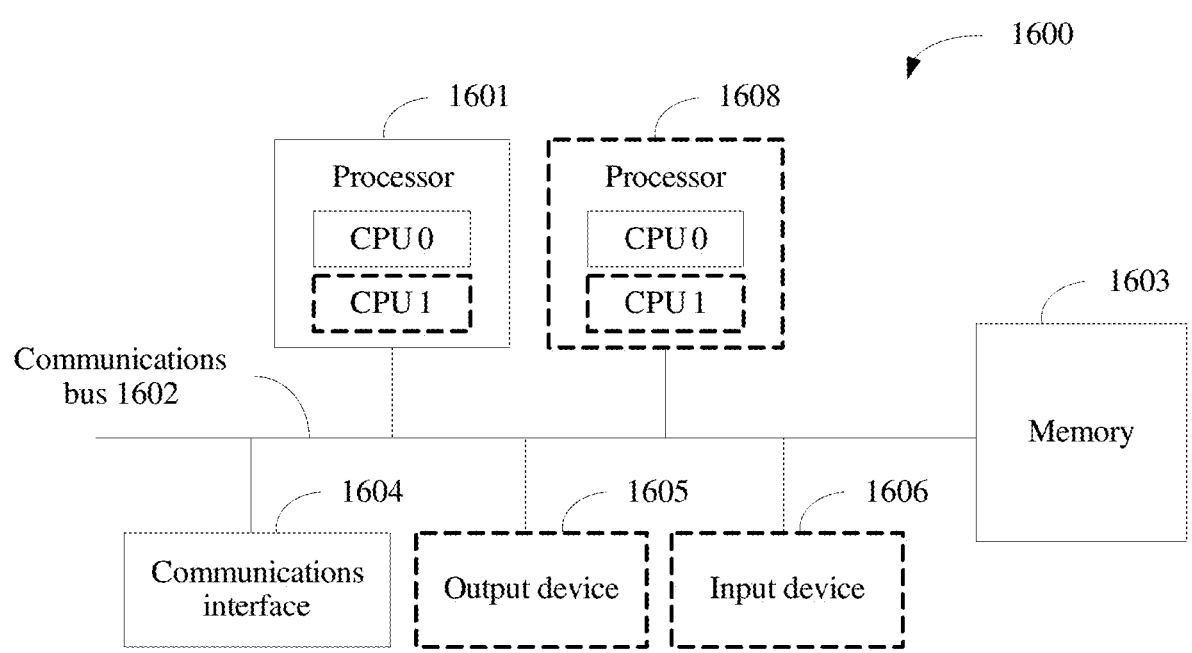
FIG. 16 is a schematic structural diagram of an embodiment of a computer device according to the present disclosure.

As shown in FIG. 16, a specific structure of a computer device provided in this embodiment is described. FIG. 16 is a schematic structural diagram of an embodiment of a computer device according to the present disclosure. The computer device in this embodiment may be the live broadcast client, the live broadcast proxy client, or the live broadcast proxy management server. Differences in function implementation of the live broadcast client, the live broadcast proxy client, and the live broadcast proxy management server are caused only by different software code stored in a memory. A specific logic module and function of the software code are described in the foregoing embodiments, and are not described again.

The computer device 1600 includes at least one processor 1601, a communications bus 1602, a memory 1603, and at least one communications interface 1604.

The processor 1601 may be one general-purpose central processing unit (CPU), a microprocessor, an application-specific integrated circuit (ASIC), or one or more integrated circuits for controlling program execution of the solutions of the present disclosure.

The communications bus 1602 may include a path, to transmit information between the foregoing components.

The communications interface 1604, which uses any apparatus such as a transceiver, is configured to communicate with another device or a communications network, such as an Ethernet network, a radio access network (RAN), or a wireless local area network (WLAN).

The memory 1603 may be a read-only memory (ROM), a static storage device of another type that can store static information and an instruction, a random-access memory (RAM), or a dynamic storage device of another type that can store information and an instruction; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory 1603 is not limited thereto. The memory may exist independently and be connected to the processor through a bus. Alternatively, the memory may be integrated with the processor.

The memory 1603 is configured to store application program code for executing the solution of the present disclosure, which is controlled and executed by the processor 1601. The processor 1601 is configured to execute the application program code stored in the memory 1603, so as to implement a logical function of the computer device 1600, to execute the function associated with the live broadcast method in the foregoing embodiment.

In specific implementation, in an embodiment, the processor 1601 may include one or more CPUs, such as a CPU0 and a CPU1 in FIG. 16.

In specific implementation, in an embodiment, the computer device 1600 may include a plurality of processors, such as the processor 1601 and a processor 1608 in FIG. 16. Each of the processors may be a single-core (single-CPU) processor, or may be a multi-core (multi-CPU) processor. The processor herein may be one or more devices, circuits, and/or processing cores used for processing data (for example, a computer program instruction).

In specific implementation, in an embodiment, the computer device 1600 may further include an output device 1605 and an input device 1606. The output device 1605 communicates with the processor 1601, and may display information in a plurality of manners. The computer device 1600 may be a general-purpose computer device or a dedicated computer device.

An embodiment of the present disclosure further provides a computer storage medium configured to store a computer software instruction for implementing the live broadcast method in the foregoing method embodiment, and the computer software instruction includes a program designed to execute the foregoing method embodiment. The live broadcast method provided in the embodiment of the present disclosure can be implemented by executing the stored program.

It should be noted that, for brevity of description, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

Although the present disclosure is described with reference to the embodiments, in a process of implementing the present disclosure that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of plurality. A single processor or another single unit may implement several functions enumerated in the claims. Some measures are recorded in dependent claims that are different from each other, but this does not mean that these measures cannot be combined to produce a better effect.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code. The computer program is stored/distributed in a proper medium and is provided together with another hardware or used as a part of the hardware, or may be distributed in another form, such as by using the Internet or another wired or wireless telecommunications system.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specified function in one or more processes in the flowcharts and/or in one or more blocks in the block diagrams.

These computer program instructions may alternatively be stored in a computer readable memory that can instruct a computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although the present disclosure is described with reference to specific features and the embodiments thereof, obviously, various modifications and combinations may be made to them without departing from the scope of the present disclosure. Correspondingly, the specification and accompanying drawings are merely example descriptions of the present disclosure defined by the appended claims, and are considered as covering any or all of modifications, variations, combinations or equivalents that are within the scope of the present disclosure. Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method comprising:
    receiving, by a live broadcast client, from a live broadcast management server and via the Internet, a push-stream address comprising a first Internet Protocol (IP) address of a live broadcast server and comprising a live broadcast channel identifier (ID);
    sending, by the live broadcast client, to a live broadcast proxy client and via a home network, a proxy push-stream request comprising the push-stream address, wherein the proxy push-stream request is for determining the live broadcast server for receiving live broadcast data;
    sending, by the live broadcast proxy client to a live broadcast proxy management server in a dedicated network connected to the live broadcast proxy client, the proxy push-stream request, wherein a live broadcast proxy server is in the dedicated network, wherein the live broadcast proxy server has a second IP address and a dedicated network address, wherein a dedicated network live broadcast channel identifier (ID) is created on the live broadcast proxy management server corresponding to the live broadcast channel ID, and wherein a correspondence between the dedicated network live broadcast channel ID and the push-stream address is saved on the live broadcast proxy server;
    receiving, by the live broadcast proxy client and from the live broadcast proxy management server, a proxy push-stream address comprising the dedicated network address and the dedicated network live broadcast channel ID;
    sending, by the live broadcast client and to the live broadcast proxy client, collected live broadcast data; and
    pushing, by the live broadcast client and to the live broadcast server over an uplink of the dedicated network, the live broadcast data,
    wherein the dedicated network is an IP television (IPTV) network, and wherein the live broadcast proxy client is a client in the dedicated network.

2. The method of claim 1, wherein before sending the collected live broadcast data, the method further comprises receiving, by the live broadcast client and from the live broadcast proxy client, a response message comprising a dedicated network push-stream instruction parameter.

3. The method of claim 2, wherein the dedicated network push-stream instruction parameter instructs the live broadcast client to push the live broadcast data to the live broadcast server over the uplink.

4. The method of claim 1, wherein before sending the collected live broadcast data, the method further comprises determining, by the live broadcast proxy management server, that the live broadcast server has a dedicated network address in the dedicated network.

5. The method of claim 1, further comprising sending, by the live broadcast client and to the live broadcast proxy client, the live broadcast data.

6. The method of claim 5, further comprising pushing, by the live broadcast proxy client and to the live broadcast proxy server, the live broadcast data based on the proxy push-stream address so that the live broadcast proxy server can forward and push, to the live broadcast server, the live broadcast data based on the push-stream address.

7. A live broadcast client comprising:
    a memory configured to store instructions; and
    a processor coupled to the memory and configured to execute the instructions to cause the live broadcast client to:
        receive, from a live broadcast management server and via the Internet, a push-stream address comprising a first Internet Protocol (IP) address of a live broadcast server and comprising a live broadcast channel identifier (ID);
        send, to a live broadcast proxy client and via a home network, a proxy push-stream request comprising the push-stream address, wherein the proxy push-stream request is for determining the live broadcast server for receiving live broadcast data;

send, to a live broadcast proxy management server in a dedicated network connected to the live broadcast proxy client, the proxy push-stream request, wherein a live broadcast proxy server is in the dedicated network, wherein the live broadcast proxy server has a second IP address and a dedicated network address, wherein a dedicated network live broadcast channel identifier (ID) is created on the live broadcast proxy management server corresponding to the live broadcast channel ID, and wherein a correspondence between the dedicated network live broadcast channel ID and the push-stream address is saved on the live broadcast proxy server;

receive, from the live broadcast proxy management server, a proxy push-stream address comprising the dedicated network address and the dedicated network live broadcast channel ID;

send, to the live broadcast proxy client, collected live broadcast data; and push, to the live broadcast server over an uplink of the dedicated network, the live broadcast data, wherein the dedicated network is an IP television (IPTV) network, and wherein the live broadcast proxy client is a client in the dedicated network.

8. The live broadcast client of claim 7, wherein before sending the collected live broadcast data, the processor is further configured to execute the instructions to cause the live broadcast client to receive, from the live broadcast proxy client, a response message comprising a dedicated network push-stream instruction parameter.

9. The live broadcast client of claim 8, wherein the dedicated network push-stream instruction parameter instructs the live broadcast client to push the live broadcast data to the live broadcast server over the uplink.

10. The live broadcast client of claim 7, wherein the live broadcast server has a dedicated network address in the dedicated network.

11. The live broadcast client of claim 7, wherein the processor is further configured to execute the instructions to cause the live broadcast client to send, to the live broadcast proxy client, the live broadcast data, and wherein the live broadcast data is pushed to a live broadcast proxy server based on a proxy push-stream address so that the live broadcast proxy server can forward.

12. The live broadcast client of claim 11, wherein the processor is further configured to execute the instructions to cause the live broadcast client to push, to the live broadcast server, the live broadcast data based on the push-stream address so that the live broadcast proxy server can forward and push, to the live broadcast server, the live broadcast data based on the push-stream address.

13. A non-transitory computer-readable medium storing instructions that, when executed by a processor, cause a live broadcast client to:

receive, from a live broadcast management server and via the internet, a push-stream address comprising a first Internet Protocol (IP) address of a live broadcast server and comprising a live broadcast channel identifier (ID);

send, to a live broadcast proxy client and via a home network, a proxy push-stream request comprising the push-stream address, wherein the proxy push-stream request is for determining the live broadcast server for receiving live broadcast data;

send, to a live broadcast proxy management server in a dedicated network connected to the live broadcast proxy client, the live broadcast data, the proxy push-stream request, wherein a live broadcast proxy server is in the dedicated network, wherein the live broadcast proxy server has a second IP address and a dedicated network address, wherein a dedicated network live broadcast channel identifier (ID) is created on the live broadcast proxy management server corresponding to the live broadcast channel ID, and wherein a correspondence between the dedicated network live broadcast channel ID and the push-stream address is saved on the live broadcast proxy server;

receive, from the live broadcast proxy management server, a proxy push-stream address comprising the dedicated network address and the dedicated network live broadcast channel ID;

send, to the live broadcast proxy client, collected live broadcast data; and push, to the live broadcast server over an uplink of the dedicated network, the live broadcast data, wherein the dedicated network is an IP television (IPTV) network, and wherein the live broadcast proxy client is a client in the dedicated network.

14. The non-transitory computer-readable medium of claim 13, wherein before sending the collected live broadcast data, the instructions, when executed by the processor, further cause the live broadcast client to receive, from the live broadcast proxy client, a response message comprising a dedicated network push-stream instruction parameter.

15. The non-transitory computer-readable medium of claim 14, wherein the dedicated network push-stream instruction parameter instructs the live broadcast client to push the live broadcast data to the live broadcast server over the uplink.

16. The non-transitory computer-readable medium of claim 13, wherein the live broadcast server has a dedicated network address in the dedicated network.

17. The non-transitory computer-readable medium of claim 13, wherein the instructions, when executed by the processor, further cause the live broadcast client to send, to the live broadcast proxy client, the live broadcast data.

18. The non-transitory computer-readable medium of claim 17, wherein the instructions, when executed by the processor, further cause the live broadcast client to push, to the live broadcast proxy server, the live broadcast data based on the proxy push-stream address so that the live broadcast proxy server can forward and push, to the live broadcast server, the live broadcast data based on the push-stream address.

* * * * *